United States Patent [19]
Bergstrom et al.

[11] Patent Number: 5,631,956
[45] Date of Patent: *May 20, 1997

[54] HIGH DENSITY TELEPHONE NETWORK INTERFACE UNIT

[75] Inventors: Eric P. Bergstrom, St. Charles; Richard A. Yndestad, Naperville; John A. Washburn, Aurora, all of Ill.

[73] Assignee: Teltrend Inc., St. Charles, Ill.

[*] Notice: The term of this patent shall not extend beyond the expiration date of Pat. No. 5,521,977.

[21] Appl. No.: 649,303

[22] Filed: May 17, 1996

Related U.S. Application Data

[62] Division of Ser. No. 145,771, Oct. 29, 1993, Pat. No. 5,521,977.

[51] Int. Cl.$^6$ ................................................. H04M 19/00
[52] U.S. Cl. ........................... 379/399; 379/324; 379/413
[58] Field of Search .............................. 379/399, 412, 379/413, 324, 252, 253, 254

[56] References Cited

U.S. PATENT DOCUMENTS 5,521,977  5/1996  Bergstrom et al. ................. 379/399

Primary Examiner—Ahmad F. Matar
Assistant Examiner—Jacques M. Saint-Surin
Attorney, Agent, or Firm—McDonnell Boehnen Hulbert & Berghoff

[57] ABSTRACT

An improved network interface unit having a substantially smaller width than many prior art network interface units. The network interface unit comprises a single, planar circuit board assembly interconnected between incoming and outgoing telephone lines and incoming and outgoing customer premises lines. Two relays and a controller are mounted on the board. The controller monitors the transmission of data along the lines and, by activating the relays, provides communication and maintenance functions, such as loopback. The network interface unit utilizes a controller made up of (1) a processor-based software control system and (2) an integrally cooperating application specific integrated circuit. The controller may, for example, provide and monitor framing, detect and monitor signals, and convert bipolar data to unipolar data.

5 Claims, 9 Drawing Sheets

HIGH DENSITY TELEPHONE NETWORK INTERFACE UNIT

This is a division of application Ser. No. 08/145,771 filed Oct. 29, 1993 now U.S. Pat. No. 5,521,977.

COPYRIGHT

A portion of this disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND OF THE INVENTION

The present invention relates generally to telecommunication networks and, more particularly, to an improved high density digital network interface unit of reduced size, capable of communicating with remote transmission facilities.

Many telecommunication networks include a central office from which data, or "payload," signals may be transmitted over transmission lines to customer equipment on a customer's premises. Payload signals may comprise encoded analog or digital data.

Digital payload signals are typically sent over the transmission lines to a network interface unit ("NIU"). The NIU is located on the network side of the network interface, which is the point of demarcation between the local exchange carrier ("LEC") and the customer installation ("CI"). Where, for instance, the LEC is a local telephone company, the NIU would demarcate the point along the transmission lines where the telephone company's side of the telephone lines meets the customer's side of the telephone lines.

Electrically, the NIU is generally transparent to payload signals. However, NIU's have traditionally been used to provide special maintenance functions such as signal loopback. Signal loopback enhances carrier maintenance operation by allowing the LEC, such as the local telephone company, to remotely sectionalize problems along the transmission lines.

A channel bank receives signals from the NIU and converts the payload from digital signals to analog signals. The channel bank transmits an analog signal for each channel differentially on two wire conductors known as a Tip-Ring pair.

The Bell telephone system in the United States, for example, has widely utilized a digital time-domain multiplexing pulse code modulation system known as the T-1 transmission system. In the T-1 system, the data to be transmitted over the lines, such as speech, may be sampled at a rate of 8,000 hertz, and the amplitude of each sample is measured. The amplitude of each sample is compared to a scale of discrete values and assigned a numeric value. Each discrete value is then encoded into binary form. Representative binary pulses appear on the transmission lines.

The binary form of each sample pulse consists of a combination of seven pulses, or bits. An eighth bit is added to the end of the combination, or byte, to allow for signaling.

Repetitively, each of the twenty-four channels on the T-1 system is sampled within a 125 microsecond period (equivalent to ⅛,₀₀₀) of a second). This period is called a "frame." Since there are eight bits per channel and there are twenty-four channels, and there is one pulse at the end of each frame, the total number of "bits" needed per frame is 193. Thus, the resulting line bit rate for T-1 systems is 1.544 million bits per second.

Each frame of digital data is typically delimited by a "frame bit" (or "framing bit") or a series of frame bits. A frame bit serves as a flag, enabling line elements to distinguish the frame from the preceding frame or from noise on the line. In most framing protocols, whenever a receiving station detects the predetermined frame bit pattern, synchronization has been achieved. If the frame bit does not occur in its proper position in the data stream, frame loss has occurred, and synchronization with the tranmitting end has been lost.

In the T-1 protocol, a coding system is used to convert analog signals to digital signals. The coding system guarantees some desired properties of the signal, regardless of the pattern to be transmitted. The most prevalent code in the United States is bipolar coding with an all-zero limitation (also called alternative mark inversion, or "AMI").

In bipolar coding, alternate one's (high bits) are transmitted as alternating positive and negative pulses, assuring a direct current balance and avoiding base-line wander. Contrasted with bipolar coding is unipolar coding, in which every occurrence of a high bit is seen as a positive pulse. In any coding scheme, a violation of predetermined coding rules generally constitutes an error.

Each T-1 transmission system carries 24 8-kB/second voice or data channels on two pairs of exchange grade cables. One pair of cables is provided for each direction of transmission. The T-1 transmission system is used in multiples "N", providing "N"-times-24 channels on "N"-times-two cable pairs. The cables exist in sections, called "spans," between and beyond a series of regenerative repeaters. A channel bank at each end of a span interfaces with both directions of transmission. Incoming analog signals are thus time-division multiplexed, digitized and transmitted. When the digital signal is received at the other end of the line, the incoming digital signal is decoded into an analog signal, demultiplexed and filtered in order to reconstruct the original signal.

Payload signals are received by the telephone company and are transmitted, via the first span of transmission lines, to a series of regenerative repeaters separated by spans of transmission line. Regenerative repeaters are typically spaced every 6000 feet, connected by span lines. Each repeater receives data from the previous repeater or from the central office, but, because of transmission line losses, noise, interference and distortion, the signal will have degenerated. The repeater recognizes the presence or absence of a pulse at a particular point in time and, if appropriate, it regenerates, or "builds up," a clean new signal. The repeater then sends the regenerated signal along the next span of transmission line to the next repeater, stationed approximately one mile away.

The repeaters and span lines continue until the lines extend to the NIU. From the NIU, customer connections continue into customer premises.

In a T-1 transmission system, each span requires an NIU, and multiple spans are typically muted together. Therefore, multiple NIU's are usually placed together in the same physical location. Typically, network interface units are grouped together and mounted in a shelf, such as the Teltrend Rack-Mount Digital Shelf Assemblies Models DSA-120/A and DSA-111/A.

The telecommunications industry provides a standard for the dimensions of the above-discussed network interface units, the units often being referred to as "Type-400." According to the standard, a Type-400 NIU module is approximately 5.6 inches high, 5.9 inches long, and 1.4 inches wide. Accordingly, the telecommunications industry has also promulgated standards for the dimensions of a Type-400 mounting assembly (or shelf). According to the standard, each slot in an NIU mounting assembly is approximately 1.4 inches wide.

When additional customer interfaces or transmission lines are added to a network, it often becomes necessary to add additional network interface units in order to provide the required additional communication service. Unfortunately, the addition of Type-400 NIU modules has to date required additional shelf space. A need therefore exists for a digital network interface unit that will conserve existing shelf space while efficiently providing useful maintenance functions.

SUMMARY OF THE INVENTION

In a principal aspect, the present invention is an improved network interface unit having a substantially narrower width than existing network interface units, and, accordingly making more efficient use of shelf space. More particularly, the present invention provides a network interface unit comprising a single, planar circuit board assembly interconnected between incoming and outgoing telephone lines and incoming and outgoing customer premises lines. Two relays and a controller are mounted on the board. The controller monitors the transmission of data along the lines and, by activating the relays, provides communication and maintenance functions, such as loopback. The present invention utilizes a controller, made up of (1) a processor-based software control system and (2) an integrally cooperating application specific integrated circuit. The controller may, for example, provide and monitor framing, detect and monitor signals, and convert bipolar data to unipolar data.

Thus, an object of the present invention is a higher density network interface unit. A further object is a more compact network interface unit, substantially mounted on single, planar circuit board assembly, that allows a greater number of network interface units to be more easily housed in a shelf unit, or cabinet, of a particular size. These and other objects, features, and advantages of the present invention are discussed or apparent in the following detailed description.

BRIEF DESCRIPTION OF THE DRAWINGS

A preferred embodiment of the present invention is described herein with reference to the drawing wherein.

DETAILED DESCRIPTION OF THE PREFERRED EMBODIMENT

Figure 1:
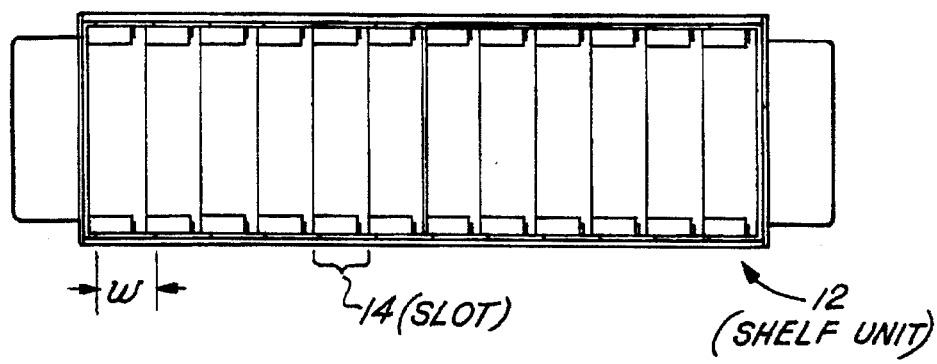
FIG. 1 is front view of a shelf unit for containing prior art network interface units.
Figure 2:
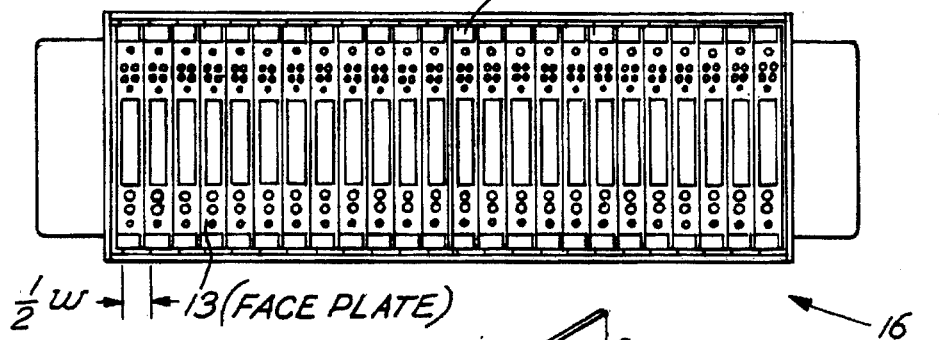
FIG. 2 is a front view of a shelf unit for containing network interface units made in accordance with the present invention.

Referring first to FIGS. 1 and 2, there is shown an advantage of the present invention, namely the reduction in required size of the network interface unit ("NIU") 10. FIG. 1 illustrates a shelf unit 12 designed to hold the prior art network interface units, in accordance with industry standards. Each slot 14 in the shelf unit of FIG. 1 is 1.433 inches wide.

FIG. 2, in contrast, illustrates a shelf unit designed to hold the network interface units made in accordance with the present invention 16. The width of an NIU made in accordance with the present invention may preferably be 0.717 inches, which is exactly half the width of the prior art NIU. Accordingly, in the span of a 17.68 inch shelf unit, the present invention allows 24 slots to hold 24 network interface units 10, whereas in the same 17.68 inch span of a shelf unit, it would only be possible to hold 12 prior art network interface units. Each NIU 10 is found on a single, multi-layered printed circuit wiring board. The prior art NIUs included assemblies having two such boards mounted together in a side-by-side relationship.

Figure 3:
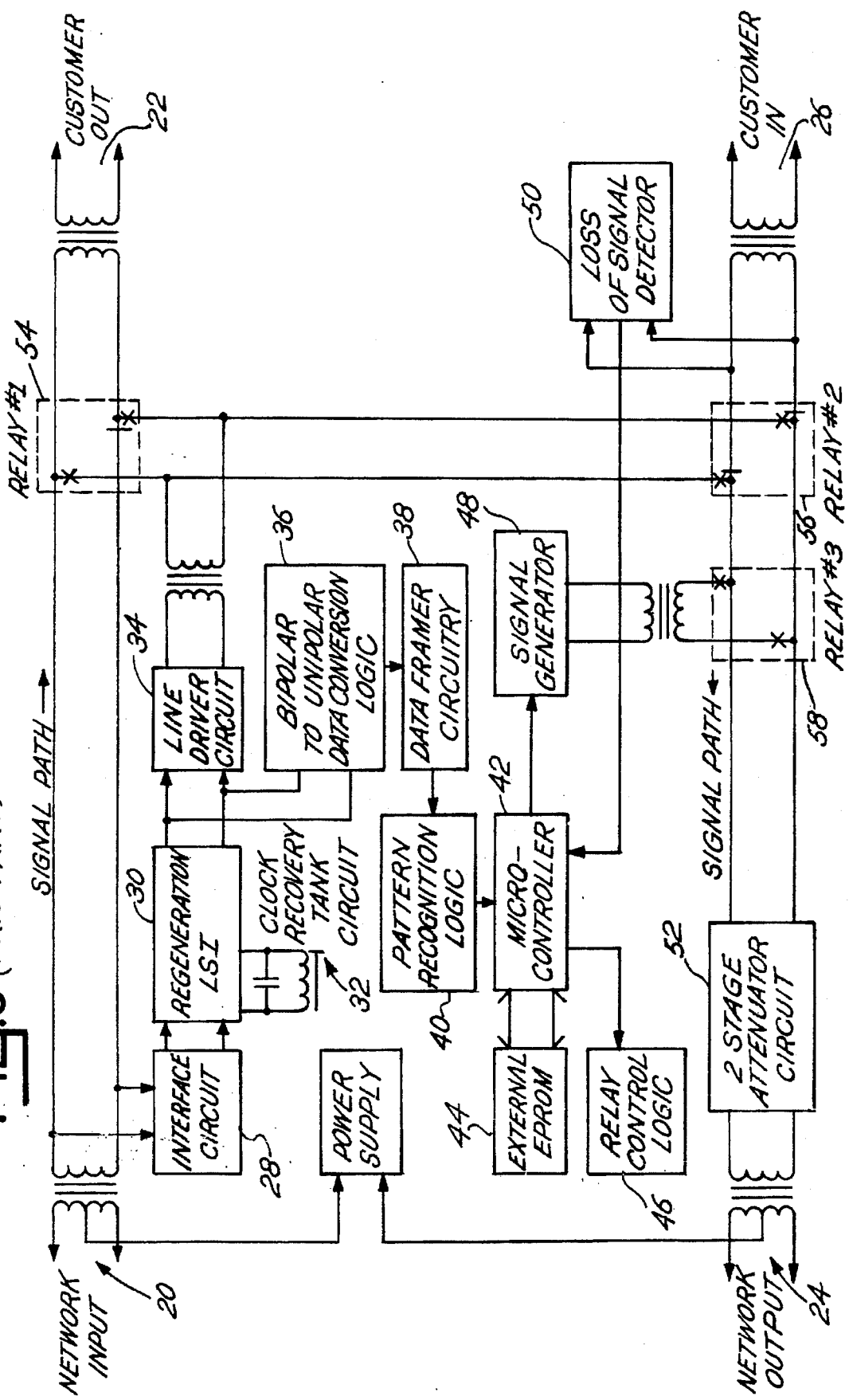
FIG. 3 is block diagram of a prior art network interface unit.

Referring now to FIG. 3, there is illustrated a prior art embodiment of a Type-400 NIU which is embodied on a dual printed circuit board device having a width of approximately 1.4 inches for mounting in a standard shelf. A payload signal in the form of a digital data stream is carried into the NIU on a pair of network input lines 20. Under normal conditions, the payload passes through a first relay 54 and then exits the NIU on customer output transmission lines 22. Thus, electrically, the NIU is transparent to a payload signal.

Inside the NIU, the payload data stream also passes to an interface circuit 28, which passes the data stream to a regeneration large scale integrated circuit 30, such as part number XR-277 manufactured by the EXAR company. The regeneration circuit 30, which must be connected to a clock recovery tank circuit 32, regenerates the data signal. The signal is then passed to a line driver circuit 34, which then passes the signal to the customer output transmission lines 22.

Interposed between the regeneration circuit 30 and the line driver circuit 34 is a bipolar to unipolar data conversion circuit 36, which converts data from bipolar coding to unipolar coding and passes the signal to data framer circuitry 38. The data framer circuitry 38 detects framing patterns. From the data framer circuitry 38, the data then passes to pattern recognition logic circuitry 40, which, for instance, scans the data stream for codes sent by the central office.

A microcontroller 42, such as one manufactured by Intel Inc. as part number 80C31, receives the data stream from the pattern recognition logic circuitry 40 and communicates with an external EPROM 44. The microcontroller in turn communicates with relay control logic circuitry 46 and with signal generator circuitry 48.

Customer input transmission lines 26 enter the NIU and carry a payload that passes through a loss-of-signal detector 50 and a two-stage attenuator circuit 52. The loss-of-signal detector is connected to and communicates with the microcontroller 42. After passing through the two-stage attenuator circuit 52, the data exits the NIU on the network output transmission lines 24.

A second relay 56 is connected to the customer input transmission lines 26 subsequent to the loss-of-signal detector 50. Upon detection of a predetermined pattern in the data stream, the microcontroller 42 and relay control logic 40 may cause the first and second relays 54, 56 to turn off the customer input and output transmission paths, and to instead enter a loopback mode. In the loopback mode, the network input data stream (from the network input 20) is passed through the first and second relays 54, 56 and returned through the two-stage attenuator circuit 52 to the network output lines 24.

A third relay 58 is connected on the return transmission lines down line from the second relay 56. The signal generator 48 (which is controlled by the microcontroller 42) is connected with the third relay 58. Thus, for example, upon detection of a predetermined pattern in the data stream, the microprocessor 42 may cause the signal generator 48 to generate a specific signal that will then pass through the third relay 58, through the two-stage attenuator circuit 52, and out through the network output transmission lines 24.

Figure 4:
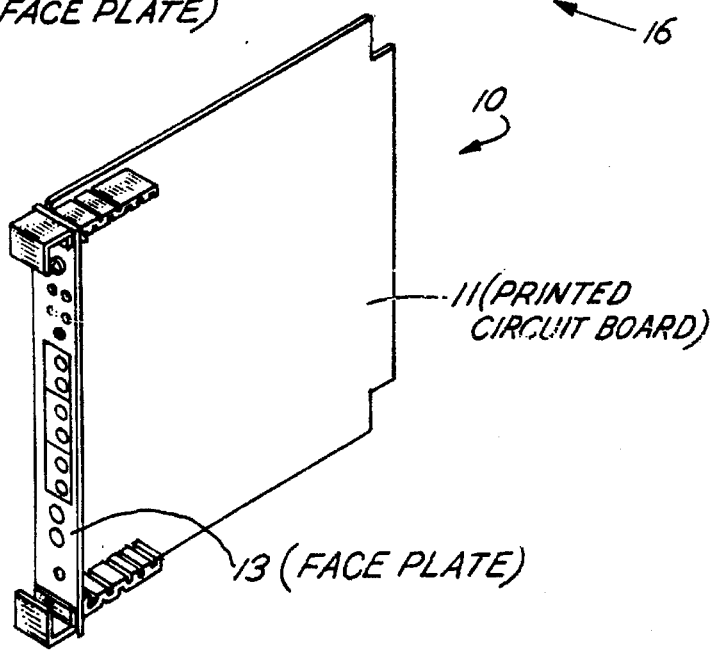
FIG. 4 is perspective view of a printed circuit board assembly embodying a network interface unit made in accordance with the present invention.
Figure 5:
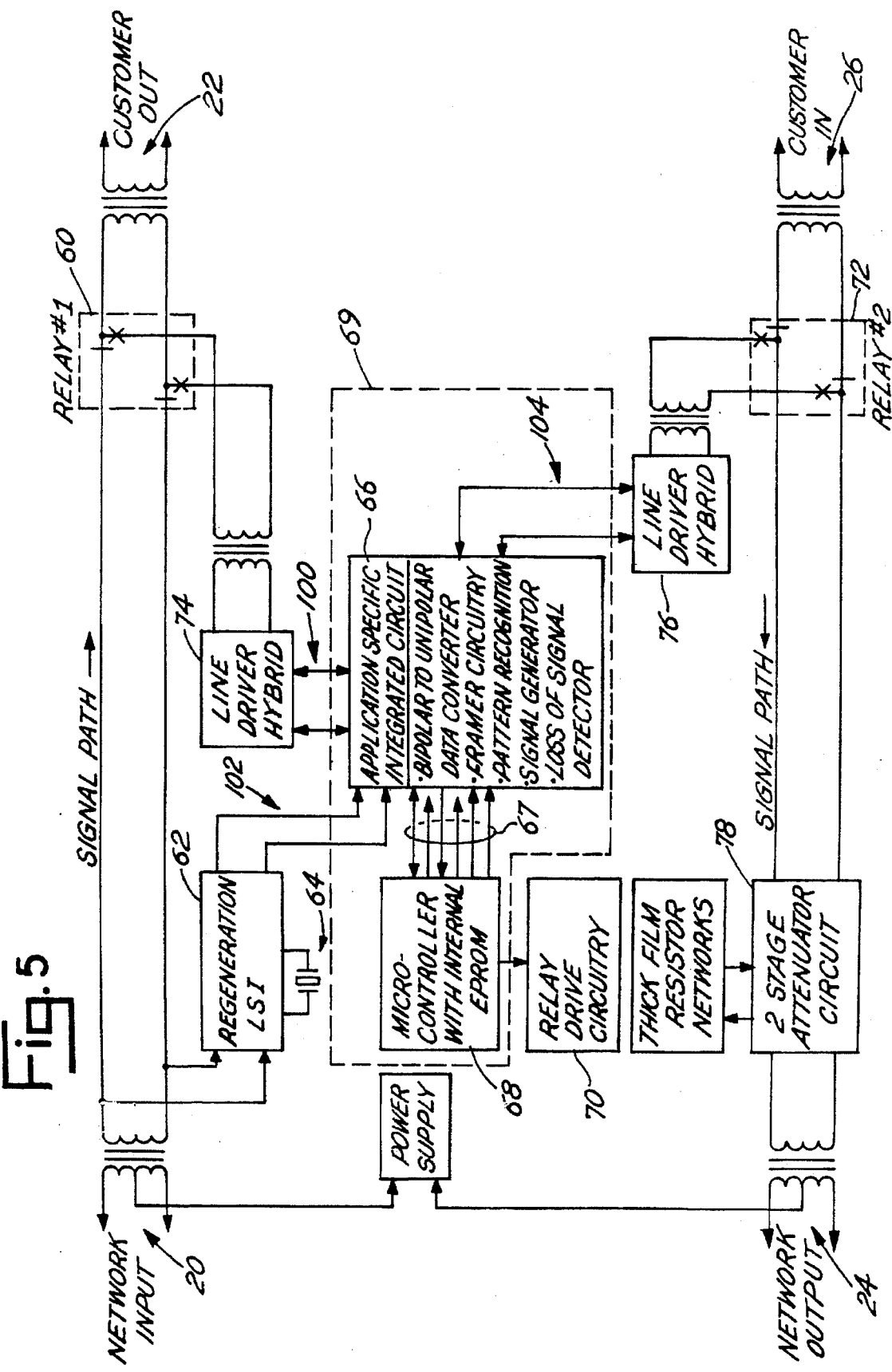
FIG. 5 is a block diagram of a network interface unit made in accordance with the present invention.

The high density network interface unit of the present invention improves over the prior art Type-400 NIU. Refer to FIGS. 4 and 5, in which a block diagram of an NIU 10 made in accordance with the present invention is illustrated. As shown in FIG. 4, the NIU 10 is substantially mounted on a single, multi-layered printed circuit board 11. In the present context, printed circuit board refers to any such substantially planar circuit board or to a combination of such boards affixed to each other in a substantially planar relationship (rather than in an adjacent surface relationship). The board 11 measures approximately 5½ inches on each side. A face plate 13 is mounted orthoganally along one edge of the board 11.

A payload signal enters the NIU 10 on the network transmission input lines 20. These may be referred to as incoming digital telephone lines, since data comes to the customer premises through these lines. The payload may pass directly through a first relay 60 in the NIU and exit on the customer output lines 22, which may also be referred to as the incoming customer premises lines. Similarly, network output transmission lines 24 may also be referred to as outgoing digital telephone lines, and the customer input transmission lines 26 may be referred to as outgoing customer premises telephone lines.

In addition, internal to the NIU, the payload signal passes to a regeneration large scale integrated circuit 62, which is connected to a quartz crystal controlled phase locked loop ("PLL") circuit 64. In the preferred embodiment, the regeneration circuit 62 is part number LXT312 or LXT315 as manufactured by Level 1 Communications Inc. The PLL circuit 64 connected to the regeneration circuit 62 provides a means for synchronizing the clock signal on the receiving line with the internal locally generated clock. The interface circuit 28 and clock recovery tank circuit 32 of the prior art NIU are thus eliminated.

The regeneration large scale integrated circuit 62 is connected to an application specific integrated circuit ("ASIC") 66, to which the regeneration circuit 62 passes the data. The ASIC 66 of the present invention is manufactured by LSI Logic, Inc. Alternatively, a product manufactured by the Xilinx corporation, described as a "programmable gate array" (part number XC2018, XC3030 or XC3042), could be used in place of the LSI Logic ASIC.

In the preferred embodiment, the single ASIC 66 provides (i) bipolar to unipolar data conversion, (ii) data framer circuitry, (iii) pattern recognition logic, (iv) signal generation, and (v) loss of signal detection, each of which will be discussed below. The ASIC 66 integrally communicates with and cooperates with a microprocessor 68 (such as a Motorola MC68705C8 microprocessor, or, alternatively, the Intel 87C51 or the Texas Instruments TMS70C00) having an internal "one-shot" EPROM. The microprocessor 68 and ASIC 66 communicate with each other via a bus 67. The microprocessor 68 and ASIC 66 may be considered as a single, unitary controller 69. Substantial "savings" of space on the board is thus achieved by using such an ASIC-microprocessor based controller 69 to control the operation of the NIU 10.

The microprocessor 68 is also connected to relay drive circuitry 70 for controlling the first relay 60 and a second relay 72. Notably, in the prior art, the EPROM 44 was external to the microcontroller 42. By designing the EPROM to be internal to the microprocessor 68 of the present invention, the required circuit board area is reduced.

A control system is encoded on the EPROM internal to the microprocessor 68. The control system is embodied in software integrally communicating with and integrally cooperating with the ASIC 66 in order to perform various functions. Again, implementation of the control function with software or firmware in the controller 69 allows substantial savings of space on the board 11. A detailed discussion of the control system encoded in the preferred embodiment of the present invention is provided below.

As noted, the ASIC provides bipolar to unipolar conversion. Bipolar digital data is in essence an AC signal, in which every other 1 is positive and every other 1 is negative. Thus, bipolar coding provides that a logic 0 is encoded with zero voltage while a logic 1 is alternatively encoded with positive and negative voltages. The average voltage level is thereby maintained at zero in order to eliminate dc components in the signal spectrum.

A unipolar signal, in contrast, involves only positive numbers. A bipolar signal is in fact two unipolar signals, one representing positive bits and one representing negative bits, both aligned by a local clock.

As is well-known by those of ordinary skill in the art, AC signals travel better over long distances than do DC signals. Therefore, throughout the telecommunication network transmission lines, signals are transmitted in AC form. However, a microprocessor is incapable of understanding bipolar signals. Therefore, for purposes of the NIU 10, the bipolar signal must be converted into a unipolar signal prior to or upon entry to the NIU 10.

The conversion from bipolar to unipolar encoding in the preferred embodiment of the present invention is accomplished in two stages. First, the regeneration large scale integrated circuit 62 converts the positive half of the incoming bipolar signal to a first unipolar pulse and the negative half of the incoming bipolar signal to a second unipolar pulse. Next, the first and second unipolar pulses enter the ASIC 66, which passes the pulses through an OR gate, thereby producing a single unipolar (or DC) pulse representative of the payload signal. As will be discussed below, line driver circuitry then gives the resultant unipolar signal sufficient power to enable transmission of the signal in DS1 format (1.544 Mbps).

The ASIC 66 of the present invention also provides framer circuitry. In a T-1 system, every 193rd bit is a framing bit. The framer circuitry in the preferred ASIC scans the incoming data in order to find the predetermined framing pattern. The NIU may thus utilize the organized frame structure to detect or generate communication signals such as responses to maintenance or status requests.

The ASIC 66 also provides pattern recognition circuitry and signal generation circuitry. Thus, for example, the NIU is capable of scanning the incoming data stream for status requests sent by a remote line element or test set. Through its signal generation circuitry, the ASIC may independently or responsively produce communication signals in the data stream. In the preferred embodiment, the signal generation circuitry produces only high bits (1's). Examples of signals that may be generated include responsive signals sent to the central office to provide information requested by a test set, alarm indication signals ("AIS") to provide a warning signal indicating, for instance, that framing has been lost, and loopback indication signals ("LIS"), to indicate to the central office that the NIU has entered loopback mode.

As noted above, the incoming signal path passes through a first relay 60. When the controller 69 recognizes a predetermined pattern or signal in the incoming data stream requesting a loopback, the controller 69 may cause the data stream to pass through a line driver hybrid circuit 76, onto the outgoing signal path, through a two stage attenuator circuit 78, and out from the NIU 10 on the network output transmission lines 24.

The controller 69 may also recognize other requests, found on the lines 20 and 26, that makes the NIU 10 move into other modes of operation or provide additional information. Such information is provided along the lines 22 and 24 by the controller 69 in the form of a data signal. Notably, the controller 69 supplies the requested information via one of the relays 60, 72 (also used for loopback) rather than via a third separate relay. Thus, the space requirements for the board 11 are again reduced.

In many prior art NIUs, a line driver circuit utilized discrete electric components. In contrast, the line driver hybrid circuits 74, 76 in the NIU of the present invention use conductive ink resistors and surface-mounted semiconductors attached to a ceramic substrate to help reduce the circuit board area required.

Similarly, the two-stage attenuator circuit 78 in the preferred embodiment of the present invention utilizes thick film resistor networks. Such networks use a conductive ink on a ceramic substrate to replace many discrete resistor elements that would otherwise be on the board 11.

As noted above, a control system is encoded on the EPROM internal to the microprocessor 68. This control system integrally communicates with and cooperates with the ASIC 66 via the bus 67 to perform various functions. A detailed discussion of the architecture of the ASIC 66 and the programs used by the microprocessor 68 in order to perform such functions are described below.

Figure 6:
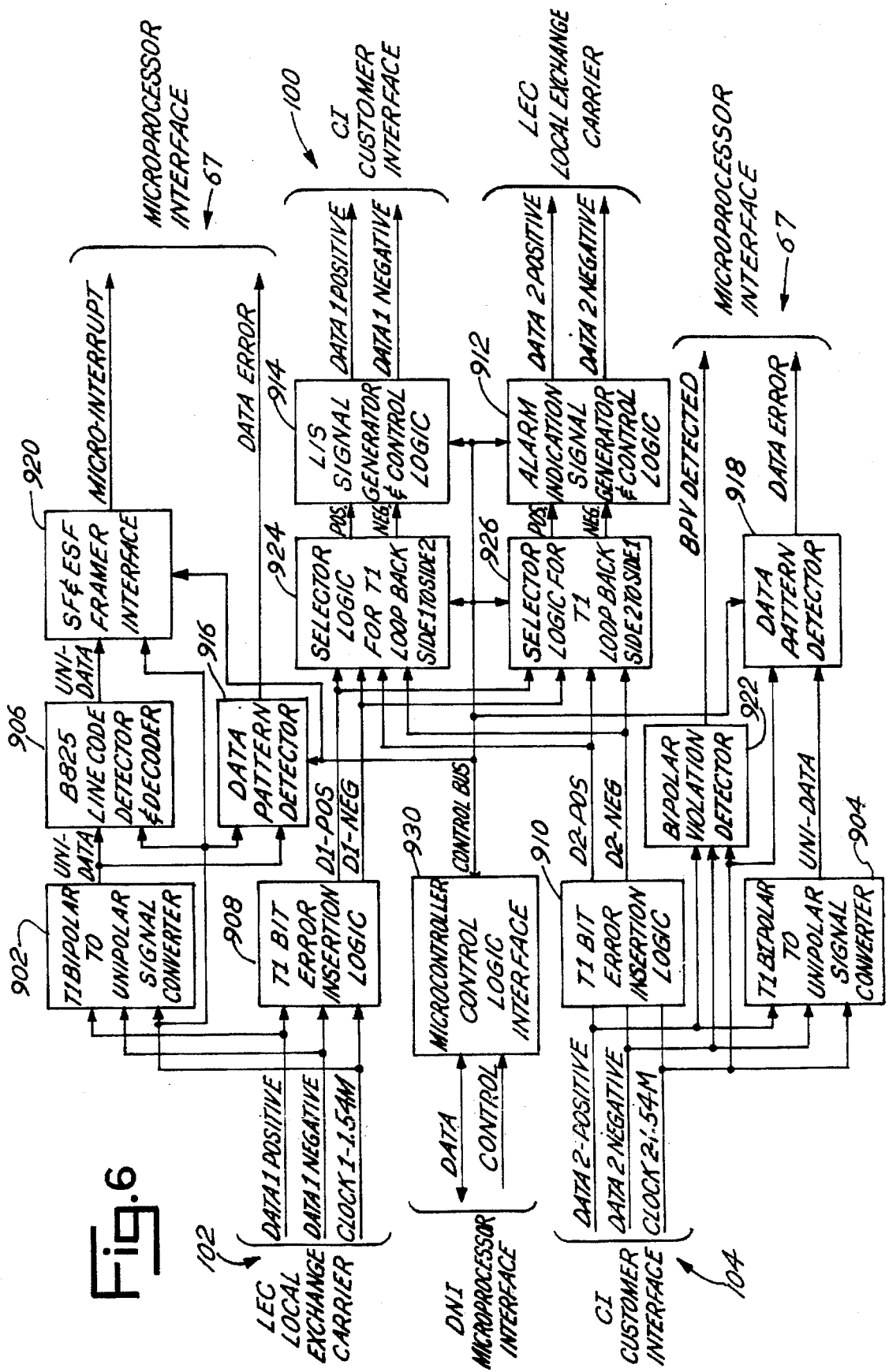
FIG. 6 is a block diagram of the application specific integrated circuit shown in FIG. 5.

FIG. 6 illustrates the architecture of the ASIC 66. As noted, the ASIC 66 provides bipolar to unipolar data conversion, shown at blocks 902-904. In addition, the ASIC 66 scans the incoming data stream to detect and decode a B8ZS line code, shown at block 906. The ASIC 66 also scans the incoming data stream, at block 920, in order to determine whether the data stream is arranged in superframing or extended superframing form.

The ASIC inserts "errors" in the data stream, according to a predetermined pattern, at blocks 908-910. The errors are introduced according to a pattern in order to communicate with external equipment, which understands that errors in the payload, following certain formats, are made by the NIU in order to communicate information.

In addition, at block 912, the ASIC 66 generates the above-discussed alarm indication ("AIS") signal, and, at block 914, the ASIC 66 generates the above-discussed loopback indication signals in the data stream. At blocks 916-918, the ASIC 66 detects patterns in the incoming data stream as discussed above, and, at block 922, the ASIC determines whether a violation of bipolar coding rules has taken place in the incoming data stream. At blocks 924-926, the ASIC 66 provides selector logic to maintain appropriate loopback conditions. An interface for the integral communication between the ASIC 66 and the microprocessor 68 of the present invention is shown at block 930.

Figure 7:
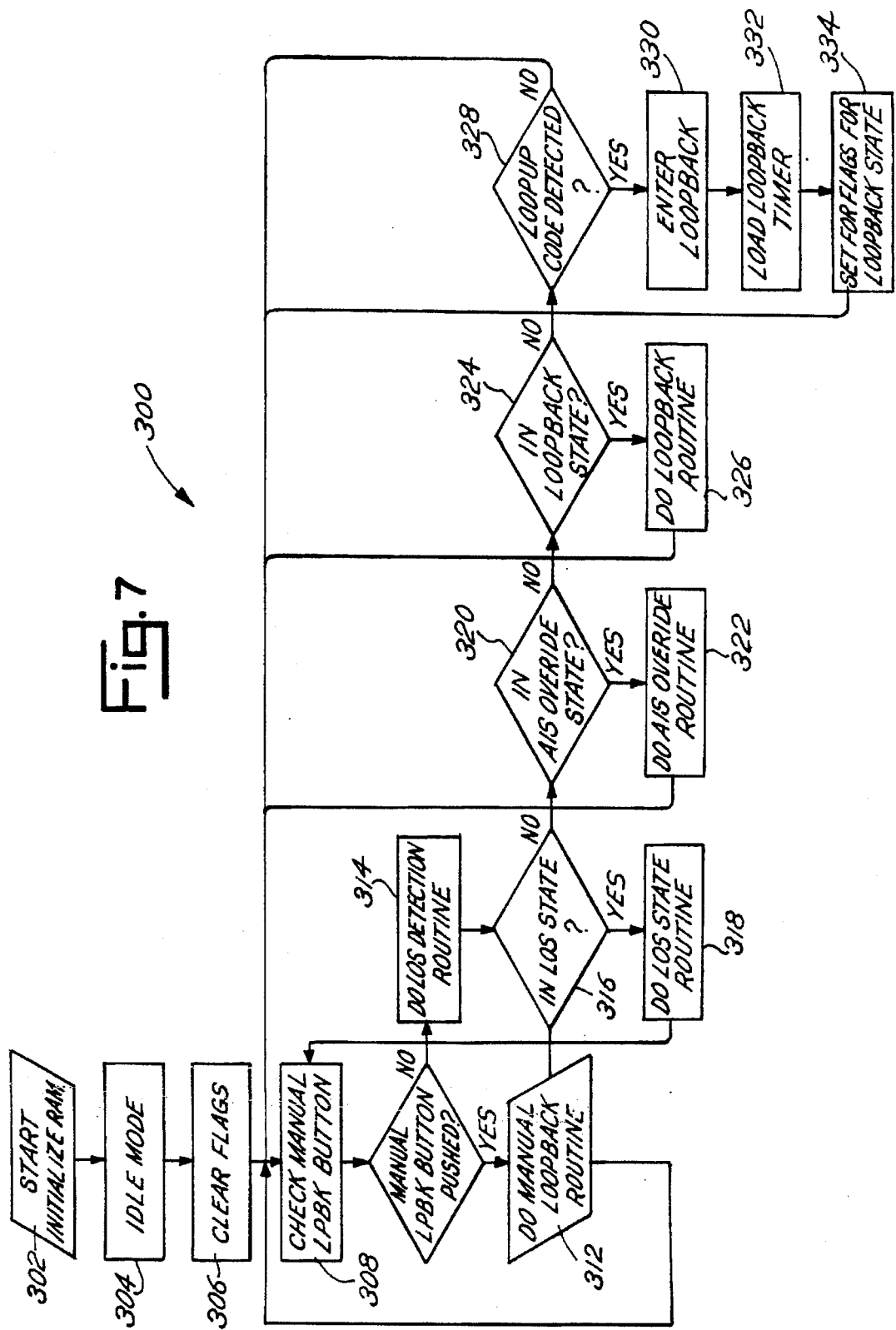
FIG. 7 is a flow chart of a Main/Idle Routine employed by the microprocessor shown in FIG. 5.

Flow charts showing a program used by the microprocessor 68 to implement the control function are shown in FIGS. 7-12. Referring first to FIG. 7, there is shown a presently preferred embodiment of a Main/Idle routine 300 employed by the microprocessor 68 of the present invention, thus embodying the present control system. The control system begins, at steps 302-306 by entering idle mode and clearing flags. In idle mode, the control system is prepared to receive predetermined signals indicating that the NIU should go into loopback mode or should respond to various states.

An NIU of the present invention may be provided with a manual button, which places the NIU in a loopback condition. Thus, at steps 308-310, the control system checks to see whether the manual loopback button is pressed. If so, then at step 312 the control system performs the steps of a Manual Loopback Routine as illustrated in the flow chart shown in FIG. 8.

Figure 8:
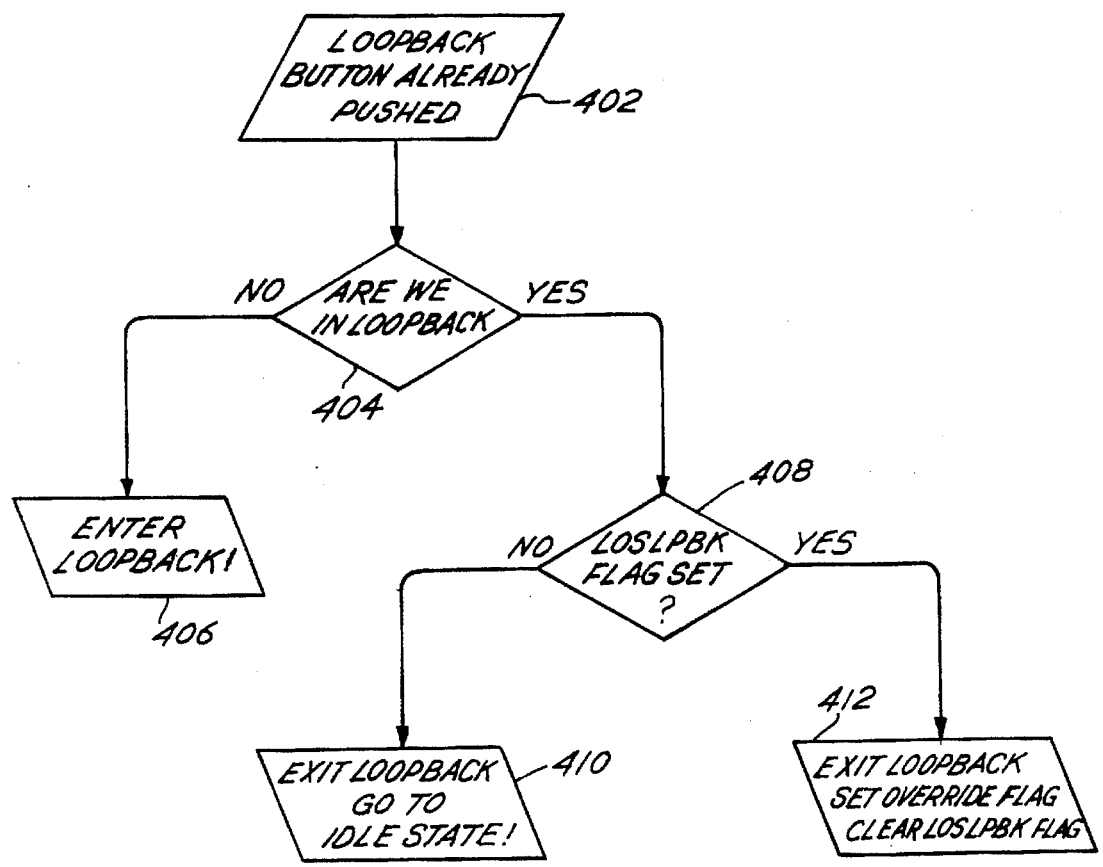
FIG. 8 is a flow chart of a Manual Loopback Mode Routine employed by the microprocessor shown in FIG. 5.

Referring to FIG. 8, at step 402, the control system is presumed to have determined that the manual loopback button has been pushed. Thus, at step 404, the control system determines whether the NIU is currently in loopback mode. If not, then the control system causes the NIU to enter loopback mode at step 406. However, if already in loopback, then at step 408, the control system determines whether the Loss of Signal ("LOS") Loopback flag is set. The LOS Loopback flag would be set if the control system had determined that no signal other than all zeros was being received by the NIU from the customer input transmission lines (i.e., from the customer side of the NIU). Had the control system detected a loss of signal, then the control system would cause the NIU to enter LOS Loopback mode, returning signals, for instance, sent to the NIU from the central office.

If, at step 408, it is determined that the LOS Loopback flag is not set, then the control system causes the NIU to exit loopback at step 410 and to return to the Main/Idle state depicted in FIG. 7. However, if, at step 408, it is determined that the LOS Loopback flag was set, then the control system needs to exit loopback mode so that, for instance, the central office may see what is happening on the other side of the NIU. Thus, at step 412, the control system exits loopback, sets an override flag to indicate that LOS Loopback has been overridden, and clears the LOS Loopback flag. The control system then returns to the Main/Idle state.

Referring again to FIG. 7, after having performed the Manual Loopback Routine at step 312, the control system then returns to an idle state beginning again at step 308. If, however, it was determined at step 310 that the manual loopback button has not been pushed, then at step 314, the control system performs a Loss of Signal Detection Routine, as illustrated by the flow chart shown in FIG. 9.

Figure 9:
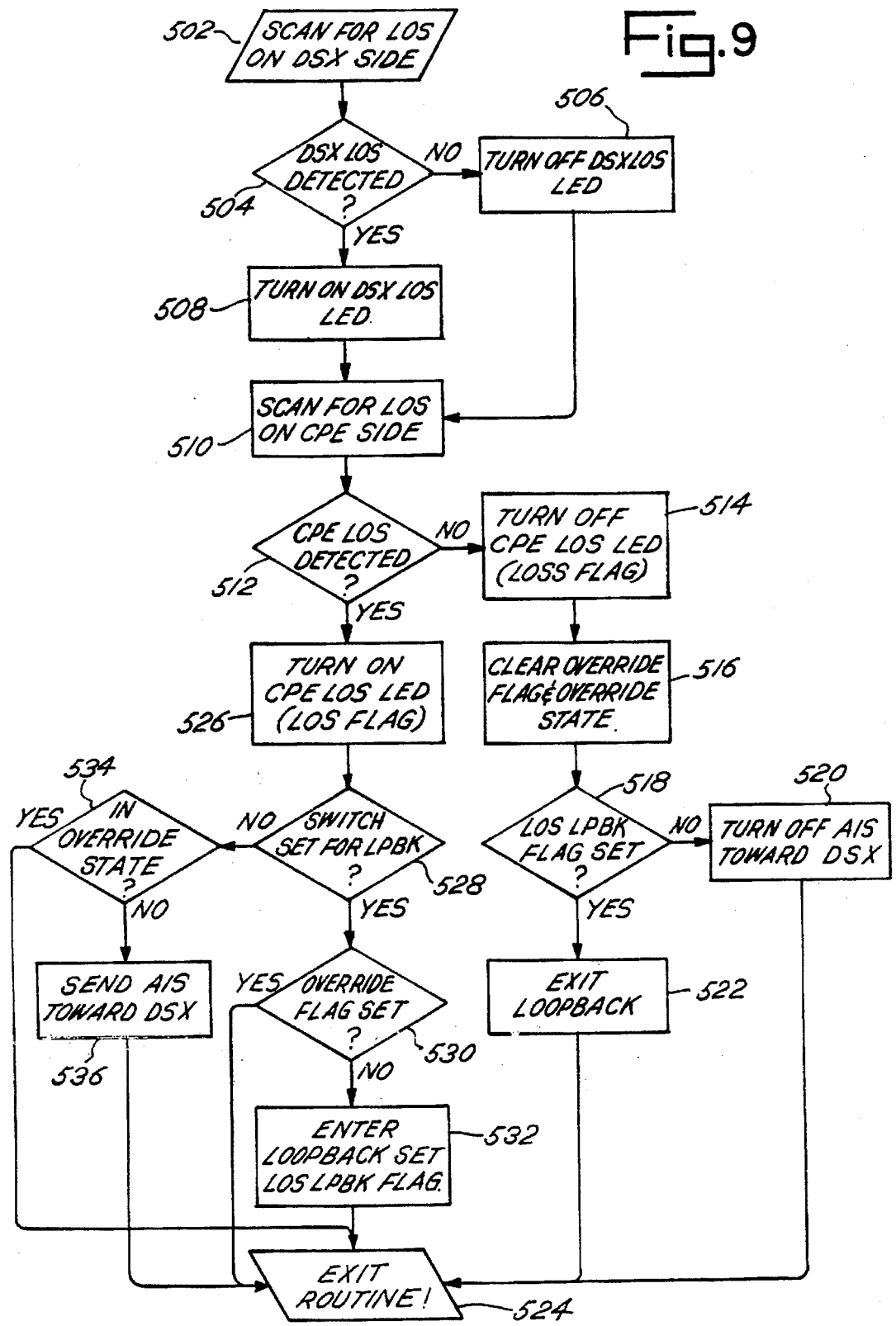
FIG. 9 is a flow chart of a Loss of Signal Detection Routine employed by the microprocessor shown in FIG. 5.

Referring to the Loss of Signal Detection Routine of FIG. 9, at steps 502–504, the control system first scans for a loss of signal on the DSX, or network, side of the NIU. A loss of signal generally consists of a signal comprising all zeros. If a loss of signal is not detected on the DSX side of the NIU, then the DSX LOS LED is turned off at step 506. However, if a loss of signal on the DSX side is detected, then the DSX LOS LED is turned on at step 508.

Next, the control system scans for a loss of signal on the customer premises ("CPE") side of NIU at steps 510–512. If a loss of signal on the CPE side of the NIU is not detected, then the CPE LOS LED is turned off at step 514. The override flag and override state have been previously set to indicate that the NIU was in an override state, in which the NIU would not react to a loss of signal. Once the CPE LOS LED has been turned off at step 514, the control system clears the override flag and override state at step 516 so that the NIU can again react to a loss of signal.

In response to a loss of signal, the NIU of the present invention may be configured either to enter LOS Loopback mode or to begin sending an alarm indication signal ("AIS") to the DSX. The AIS is a form of data signal sent along the lines 20–26 by the controller 69. Therefore, in case a loss of signal was detected, the control system determines at step 518 whether the Loss of Signal Loopback flag is set. If the LOS Loopback flag is not set, then the NIU was configured to send an AIS to the DSX rather than to enter loopback (assuming a loss of signal was detected). Therefore, since a CPE LOS was not detected at step 512, the control system turns off the AIS towards the DSX at step 520 and exits the Loss of Signal Detection Routine at step 524. However, if the LOS Loopback flag is set at step 518, then at steps 522–524, the control system causes the NIU to exit loopback, and the control system exits the Loss of Signal Detection Routine.

If, at step 512, a CPE LOS was detected, then the CPE LOS LED is turned on at step 526. At step 528, the control system then determines whether an optional switch on the NIU has been set for loopback. If so, then, if the override flag is set, the control system exits the Loss of Signal Detection Routine at step 524, but if the override flag is not set, the control system first enters loopback and sets the Loss of Signal Loopback flag at step 532, and then exits the Loss of Signal Detection Routine at step 524. However, if the control system determines that the optional switch for loopback is not set, then at step 534 the control system determines whether the NIU is in an override state. If so, then the control system exits the Loss of Signal Detection Routine at step 524. If not, however, then at step 536 the control system sends an alarm indication signal toward the DSX at step 536 and then exits the Loss of Signal Detection Routine at step 524.

Referring once again to the Main/Idle Routine shown in FIG. 7, after having performed the Loss of Signal Detection Routine at step 314, the control system determines whether the NIU is in a loss of signal state (that the NIU has determined that the payload is an extended periods of zeros) at step 316. If so, then at step 318 the control system performs a Loss of Signal State Routine as illustrated by the flow chart shown in FIG. 10.

Figure 10:
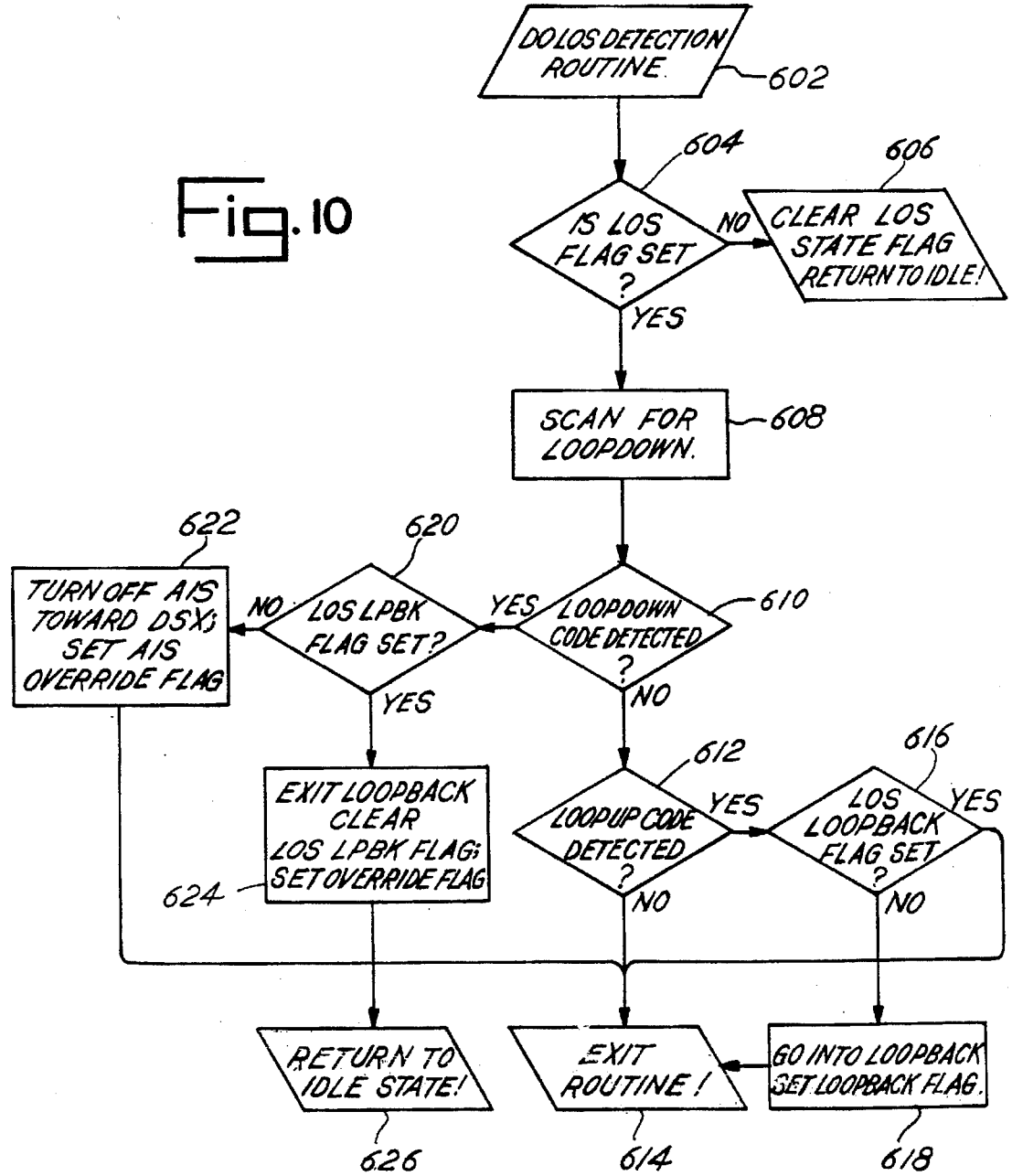
FIG. 10 is a flow chart of a Loss of Signal Routine employed by the microprocessor shown in FIG. 5.

Thus, referring now to FIG. 10, at step 602, the control system first ensures that a loss of signal has been detected, by repeating the Loss of Signal Detection Routine shown in FIG. 9. Next, at step 604, the control system determines whether the Loss of Signal flag is set. If the loss of signal flag is not set, then the loss of signal no longer exists; therefore, at step 606, the control system clears the Loss of Signal State flag and returns to the idle state at step 308 shown in FIG. 7. However, if the loss of signal flag is set, then, at steps 608–610, the control system scans for a loopdown code.

The control system must determine whether the NIU is in Loss of Signal Loopback mode (pursuant to an optional configuration in which the NIU responds to loss of signal by entering LOS Loopback), or rather whether the NIU is sending an AIS to the DSX (pursuant to an optional configuration in which the NIU responds to a loss of signal by sending an AIS to the DSX). Thus, if a loopdown code is not detected at step 610, then, at step 612, the control system must determine whether the NIU is receiving a loop-up code (because the NIU might be sending an AIS rather than being in LOS Loopback). If a loop-up code is not detected, then the control system exits the Loss of Signal State Routine at step 614. However, if a loop-up code is detected at step 612, then if the Loss of Signal Loopback flag is set, the control system exits the Loss of Signal State Routine at step 614, but if the Loss of Signal Loopback flag is not set, then, at steps 618 and 614, the control system causes the NIU to enter loopback and sets the loopback flag and exits the Loss of Signal State Routine.

If, however, a loopdown code is detected at step 610, then, at step 620, the control system determines whether the Loss of Signal Loopback flag is set. If the Loss of Signal Loopback flag is not set, then at step 622, the control system has the capability to turn off the AIS and sets the AIS override flag to indicate that the AIS has been overridden. If, however, the Loss of Signal Loopback flag is set, then, at step 624, the control system exits loopback, clears the Loss of Signal Loopback flag, and sets the override flag to indicate that Loss of Signal Loopback has been overridden. At step 626, the control system then returns to idle state at step 308 of the Main/Idle routine shown in FIG. 7.

Returning to FIG. 7, after having performed the Loss of Signal State Routine, the control system returns to idle mode at step 308. If, however, it was determined at step 316 that the NIU was not in a Loss of Signal State, then, at step 320, the control system determines whether the NIU is in an AIS Override state. An AIS Override state would exist where the NIU had been sending all 1's to the DSX but was stopped so that the DSX could see what was happening on the CPE side of the NIU. If the NIU is in an AIS Override state, then, at step 322, the control system performs the steps of an AIS Override State Routine as illustrated by the flow chart shown in FIG. 11.

Figure 11:
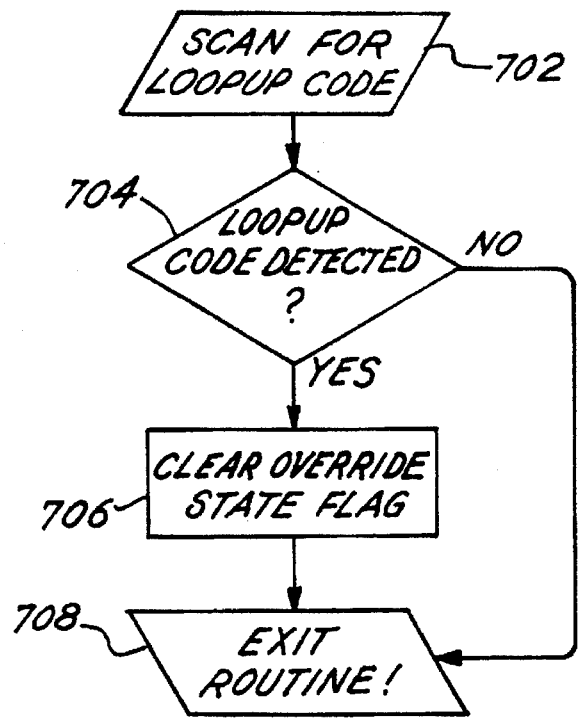
FIG. 11 is a flow chart of an Alarm Indication Signal Override Routine employed by the microprocessor shown in FIG. 5.

Referring to FIG. 11, at steps 702–704, the control system scans the data stream for a loop-up code. If the control system detects a loop-up code, then it must exit override; thus, at step 706, the control system clears the override state flag. The control system then exits the AIS Override Routine at step 708.

Referring again to FIG. 7, after the AIS Override Routine is performed at step 322, the control system returns to idle state at step 308. If, however, the control system determined at step 320 that the NIU is not in an AIS Override State, then, at step 324, the control system determines whether the NIU is in Loopback state. If the NIU is in Loopback state, then, at 326, the control system performs the steps of a Loopback Routine as illustrated by the flowchart shown in FIG. 12.

Figure 12:
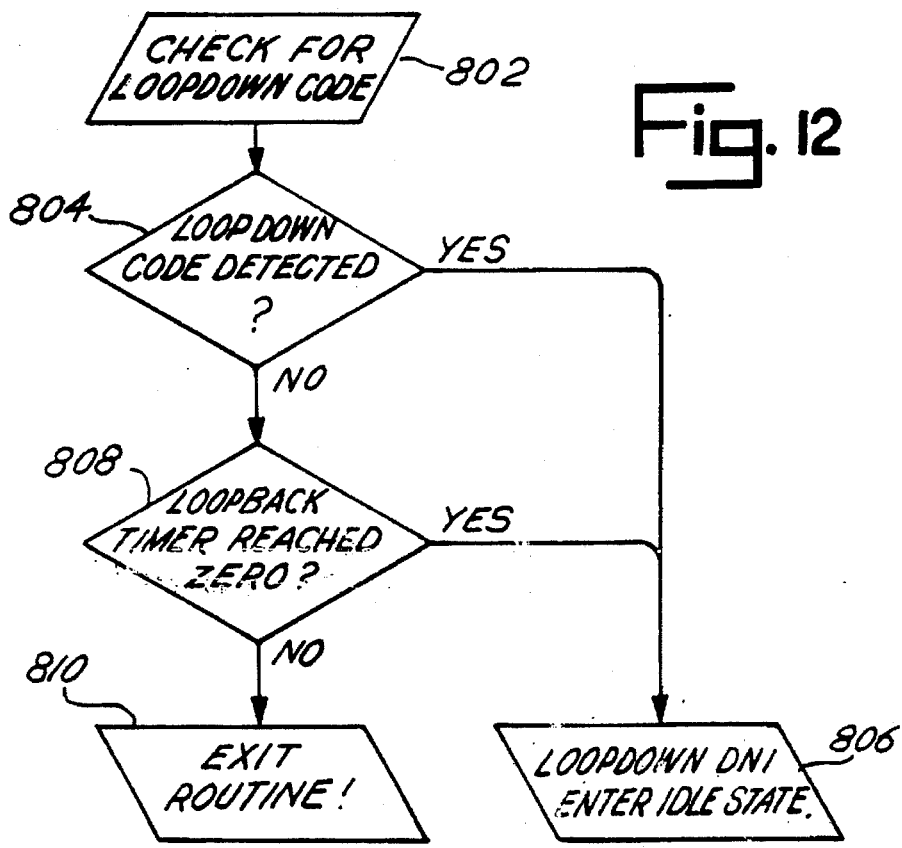
FIG. 12 is a flow chart of a Loopback Routine as employed by the microprocessor shown in FIG. 5.

Turning to FIG. 12, at steps 802–804, the control system checks for a loopdown code. If a loopdown code is detected, then, at step 806, the control system causes the NIU to exit loopback, and the control system returns to idle state at step 308 shown in FIG. 7. However, if a loopdown code is not detected, then, at step 808, the control system determines whether the optional loopback timer has reached zero. If the loopback timer has reached zero, then the control system causes the NIU to exit loopback, and the control system returns to idle stat at step 308 shown in FIG. 7. However, if the loopback timer has not expired, then the control system exits the Loopback Routine at step 810.

Returning once again to the Main/Idle Routine illustrated by the flow chart shown in FIG. 7, after performing the Loopback Routine at step 326, the control system returns to an idle state at step 308. However, if the control system determined at step 324 that the NIU is not in a Loopback State, then, at step 328, the control system determines whether a loop-up code is detected. If loop-up code is detected, then, at steps 330–334, the control system enters loopback, loads the loopback timer and sets flags for Loopback State. The control system then returns to an idle state at step 308.

In addition to the above-discussed routines as illustrated by the flow charts shown in FIGS. 7–12, the microprocessor 68 of the present invention preferably includes the following routines:

DEBOUNCE.S: This routine looks at a switch line to determine whether it changes state.

DEFINE.S: This routine sets flags used by other routines.

EQU.S: This routine prepares the random access memory (RAM) that is used in the microprocessor 68.

ESF_SUBS.S: This routine serves two purposes. First, this routine detects ESF (Extended Superframe) framing within the data stream coming from the span. If ESF is detected, then an LED is turned on, and data link bits are gathered from the framing bits. Second, this routine determines whether the data link message is a command. In particular, in the preferred embodiment, the control system looks for two commands, the ESF Loop-up and the ESF Loopdown commands. If either of these commands are detected by this routine, then appropriate flags are set, which are relied upon by loop-up and loopdown scan routines.

INT.S: This is a timed interrupt routine, which ensures that the microprocessor 68 continues running and which keeps track of all software timers and counters used in the various routines in the microprocessor 68. In addition, this routine flashes a Loopback LED when the system is in a timed loopback.

LPBK_TBL.S: This is a table used to determine whether a valid ESF Data Link command was read.

MAIN_SUB.S: This is a compilation of routines, each cooperating with other routines performed by the control system. Included in this routine are: (i) scan routines that determine the number of errors detected when scanning for a given pattern; (ii) office loopback routine that throws the relays and set the ASIC for loopback; (iii) office off routine that turns off the relays and returns the gate array to normal state; (iv) loading routines that load the gate array with the 16 bit pattern sought to be recognized by the scanning routine; (v) subroutines to delay or set timers which are used throughout the control system; and (vi) serial output routine that writes the control registers to the gate array.

OFFICFAC.S: This file contains the routines to scan for loop-up or loopdown codes. In addition, these routines check the flags for ESF (DL) loop-up or ESF (DL) loopdown.

SETUP.S: This routine prepares the main registers for the microprocessor 68, clears the RAM and initializes various control registers and flags.

As suggested above, the microprocessor 68 and ASIC 66 integrally communicate and cooperate to control the functions of the NIU. This integral cooperation is illustrated by the framing system. The microprocessor 68 and gate array are connected at three lines that are used for framing, namely the CLK_INHIBIT, the IRQ, and the ESF_DATA. The IRQ line is an interrupt line that is toggled by the gate array every 125 microseconds, which is the time that it takes 193 bits (a single frame) to enter the gate array. The CLK_INHIBIT line is driven from the microprocessor 68. When the CLK_INHIBIT line is toggled, it causes the gate array to slip one bit. The ESF_DATA line informs the processor of the state of the bit currently being examined.

If the data is not framed, then the processor will apply an algorithm to the input data to frame up the unit to ESF. In particular, the control system collects eight bits from the input line. These eight bits are 193 bits apart and are read each time the IRQ line is toggled. The algorithm separates the eight bits into four groups of two bits. These groups are then compared to incoming data in order to determine whether they match the ESF framing pattern.

If all of the groups of bits do not match the ESF framing pattern, then the CLK_INHIBIT line is toggled and it starts over again. If one of the groups fits the ESF framing pattern, the algorithm will continue comparing the incoming data for the groups until 24 bits match the framing pattern. When this occurs, the ESF_FRAME_UP bit is set to indicate that ESF data is currently being received.

When the unit is receiving ESF data, it checks input data to stay within $10^{**}(-3)$ error rate. If two consecutive frame bits are in error or four consecutive frames are in error, then the unit deems that the data is unframed.

Although the foregoing description of the preferred embodiment will enable a person of ordinary skill in the art to make and use the invention, the following detailed assembly language listing is included below. The listing provides detailed information concerning the programming and operation of the overall system. Additional detailed features of the system will become apparent to those skilled in the art from reviewing the program.

Copyright © 1993 Teltrend, Inc.

; MAIN.S

```
;****************************************************************
;   PURPOSE: This routine is the main command routine. It controls
;       what state we're in(idle,lpbk...) and what patterns, switches
;       or other control features we look for.
;****************************************************************
MAIN:
        JSR  LOAD_GATE_ARRAY        ;initialize gate array BCLR $ARM_FLAG              ;clear,look for ESF loopup
        BSET LPBK_LED               ;make sure lpbk led is off
        BRA  start_chk_main
in_main:
        BRCLR HARD_LOOP,chk_hard_loop
        JSR  DO_MAN_LPBK            ;perform manual lpbk
        BSET ARM_FLAG               ;to check esf lpwn code
        BCLR HARD_LOOP              ;done checking
        BRCLR HARD_LOOP_O,start_chk_main    ;if in lpbk,ignore lpbk code
chk_hard_loop:
        JSR  chk_los_AIS            ;check LOS and AIS enable/disable SWs
        JSR  check_loopdown_code
        BRCLR $COMP_FLAG,in_main    ;SCAN FOR PATTERN IN ONE DIRECTION
main_man_lpdn:
        JSR  LOOP_DWN start_chk_main:
        JSR  chk_manual_lpbk
        BRSET HARD_LOOP,in_main
        JSR  chk_los_AIS            ;check loss of signal and AIS enable/disable SWs
        LDX  main_current_state
        LSLX                        ;multiply reg X by 2
        JMP  main_state_table,X     ;

main_state_table:
        BRA  NORMAL_STATE           ;0 ,normal state
        BRA  AIS_OVERRIDE_STATE     ;2 ,ais override state
        BRA  AIS_LOS_STATE          ;4 ,ais state
        BRA  start_chk_main         ;6 ,should never be reached
        BRA  IN_LPBK_STATE          ;8 ,lpbk state NORMAL_STATE:
        BCLR $ARM_FLAG              ;clear this flag to begin process and look for esf arm code
        BCLR SENDING_ONES           ;This flag indicates in the process
```

-27-

```
                        ;of qualifying loopup code
            JSR  check_loopdown_code   ;check loopdown code including esf lpdwn for both side
    ARM_LOOP:
            JSR  chk_los_AIS          ;check LOS and AIS enable/disable SWs
5           BRSET CPE_LOS_LED,chk_normal_to_lpbk  ;jmp if no los of signal
            BRSET $LOS_LPBK_OVR,chk_normal_to_lpbk
            LDA  #main_ais_state_value
            STA  main_current_state   ;go to AIS state
            JMP  NORMAL_STATE_EXIT 10  chk_normal_to_lpbk:
            JSR  chk_arming
            BRSET $COMP_FLAG,ARM_CODE_DET    ;jmp if arming went away
            BRA  NORMAL_STATE_EXIT
    ARM_CODE_DET:
15          BSET $ARM_FLAG            ;esf int only look for lpdwn code ;*********************
    ; loop up the unit now
    ;*********************

DO_OFFICE_LPBK:
20          JSR  OFFICE_ON
            BCLR $LOS_LPBK_OVR
            LDA  #main_in_lpbk_value
            STA  main_current_state   ;go to LPBK state

NORMAL_STATE_EXIT:
25          JMP  MAIN_EXIT

IN_LPBK_STATE:

;***************************************************
    ;
    ; The unit is in loopback now and looking for
30  ; univ. loopdown codes
    ;
    ;***************************************************

DWN_CONT1:
            JSR  chk_arming
35          JSR  check_loopdown_code  ;check loopdown code including esf lpdwn for both
        side
            BRSET $COMP_FLAG,DWN_CODE_DET   ;CHECK IF 1ST COMP IS MADE
            BRA  IN_LPBK_STATE_EXIT DWN_CODE_DET:
40          JSR  LOOP_DWN
            LDA  #main_normal_state_value   ;go to normal state
            STA  main_current_state         ;go to normal state
```

```
        IN_LPBK_STATE_EXIT:
            BRA  MAIN_EXIT

AIS_OVERRIDE_STATE:
            BCLR $ARM_FLAG              ;clear look for esf loopup code
 5          JSR  check_loopdown_code    ;check loopdown code including esf lpdwn
            JSR  chk_arming
            BRCLR $COMP_FLAG,AIS_OVERRIDE_STATE_EXIT  ;jmp if arming went away
            LDA  #main_normal_state_value
            STA  main_current_state
10      AIS_OVERRIDE_STATE_EXIT:
            BRA  MAIN_EXIT AIS_LOS_STATE:
            JSR  chk_los_AIS            ;check LOS and AIS enable/disable SWs
            BRCLR CPE_LOS_LED,chk_ais_lpdn  ;jmp if still in los of signal
15          LDA  #main_normal_state_value   ;go to NORMAL state
            STA  main_current_state         ;go to NORMAL state
            BRA  AIS_LOS_STATE_EXIT
        chk_ais_lpdn:
            JSR  check_loopdown_code    ;check loopdown code including esf lpdwn for both
20      side
            BRCLR $COMP_FLAG,chk_ais_lpup   ;CHECK IF 1ST COMP IS MADE
            LDA  #main_ais_override_value   ;go to ais override state
            STA  main_current_state         ;go to ais override state
            JSR  XMT_AIS_xilinx             ;no ais to dsx side
25          BRCLR $LOS_AIS_SW_N,MAIN_EXIT   ;branch if not LOS lpbk
            JSR  OFFICE_OFF                 ;take unit out of lpbk
            BCLR SPAN_AIS
            BCLR LOS_LPBK_FLAG              ;clear LOS loopback flag
            BSET LOS_LPBK_OVR               ;set LOS loopback override flag
30          LDA  #main_normal_state_value   ;go to NORMAL state
            STA  main_current_state         ;go to NORMAL state
            BRA  AIS_LOS_STATE_EXIT
        chk_ais_lpup:
            BCLR $ARM_FLAG              ;clear, look for esf arm code
35          JSR  chk_arming
            BRCLR $COMP_FLAG,AIS_LOS_STATE_EXIT   ;jmp if arming went away
            BRSET LOS_LPBK_FLAG,AIS_LOS_STATE_EXIT  ;branch if in los lpbk
            JSR  OFFICE_ON
            LDA  #main_in_lpbk_value
40          STA  main_current_state     ;go to LPBK state
        AIS_LOS_STATE_EXIT:

MAIN_EXIT:
            JMP  start_chk_main

MAIN_LOP.S
45      ;-----------------------------------------------------------------
```

```
;   PURPOSE: This routine checks the status of the manual lpbk switch
;            and sets flags accordingly, the second part puts the dni
;            in lpbk or takes it out of lpbk depending on current status.
;-----------------------------------------------------------------
chk_manual_lpbk:
    BRSET   HARD_LOOP,MANUAL_LOOP_EXIT
    BRSET   MANUAL_LBK_O_N,DN_O                ;JUMP IF NO MANUAL LOOPBACK
    chk_debounce DN_O,MANUAL_LBK_O_N,CPORT     ;50 ms debounce checking
    BRSET   STATE_CHANGE_O,MANUAL_LOOP_EXIT    ;if no change,jmp
    BSET    STATE_CHANGE_O
    BSET    HARD_LOOP                  ;manual lpbk needs attention
    BSET    man_lpbk_O                 ;manual lpbk
    BRA     MANUAL_LOOP_EXIT
DN_O:
    BCLR    STATE_CHANGE_O

MANUAL_LOOP_EXIT:
    RTS

DO_MAN_LPBK:
    BRSET   LOOP_FLAG_O,clr_office_loop    ;jmp if lpbk was on
    JSR     OFFICE_ON                      ;CALL LOOPUP SUB-ROUTINE
    BSET    HARD_LOOP_O
    BCLR    man_lpbk_O                     ;set manual lpbk_O to on
    BRA     MAN_LPBK_EXIT
clr_office_loop:
    BRSET   LOS_LPBK_FLAG,DO_OVERRIDE      ;branch if LOS lpbk
    JSR     LOOP_DWN
    BCLR    man_lpbk_O
    BRA     MAN_LPBK_EXIT
DO_OVERRIDE:                               ;DO LOS LPBK OVERRIDE
    LDA     #main_ais_override_value       ;go to ais override state
    STA     main_current_state             ;go to ais override state
    JSR     XMT_AIS_xilinx                 ;no ais to dsx side
    JSR     OFFICE_OFF
    BCLR    man_lpbk_O
    BCLR    SPAN_AIS
    BCLR    LOS_LPBK_FLAG
    BSET    LOS_LPBK_OVR
    LDA     #main_normal_state_value       ;go to NORMAL state
    STA     main_current_state             ;go to NORMAL state
    LDA     #10D
    JSR     DELAY_WAIT
    BCLR    HARD_LOOP_O                    ;turn manual lpbk flag off

MAN_LPBK_EXIT:
    RTS

LOS.S
```

```
;*********************************************************************
;   PURPOSE: This routine checks for LOS from both sides and reacts
;            to the situation accordingly. This includes checking the
;            switch to see if we send AIS or go into Loopback on a
;            CPE LOS.
;*********************************************************************

;---------------------------------------------------------------
; loss of signal and AIS enable/disable checking
;---------------------------------------------------------------
chk_nonmon_debounce:    #macro
        BRSET $1,$2,chk_SW_LOW$$         ;jmp if SW is disable(active low)
        BRSET $3,$4,chk_nonmon_debounce_EXIT$$    ;jmp with no change in SW and it is enable
        BRA   chk_SW_debounce$$
chk_SW_LOW$$:                            ;SW is deactive
        BRCLR $3,$4,chk_nonmon_debounce_EXIT$$ ;jmp with no change in SW and it is disable
chk_SW_debounce$$:
        chk_debounce  $5,$1,$2    ;switch changed,50 ms debounce checking
        BSET  $3,$4               ;switch is qualified to be active
        BRA   chk_nonmon_debounce_EXIT$$
$5:                               ;SW is disable after checking
        BCLR  $3,$4               ;switch is qualified to be deactive
chk_nonmon_debounce_EXIT$$:
        #endm chk_loss_debounce_xilinx:
reload_los_debounce:
        LDX   TIME_150MS
scan_los_again:
        JSR   SCAN_QUALIFY              ;CHK IF PATTERN IS BEING RECEIVED
        BRSET HARD_LOOP,chk_loss_debounce_xilinx_exit
        BRCLR $COMP_FLAG,reload_nolos_debounce ;IF 1ST COMP LINE IS HIGH THEN PATT. DETECTED
        DEX
        BNE   scan_los_again
        BRA   chk_loss_debounce_xilinx_exit
reload_nolos_debounce:
        LDX   TIME_150MS
scan_nolos_again:
        JSR   SCAN_QUALIFY              ;CHK IF PATTERN IS BEING RECEIVED
        BRSET HARD_LOOP,chk_loss_debounce_xilinx_exit
        BRSET $COMP_FLAG,reload_los_debounce ;IF 1ST COMP LINE IS HIGH THEN PATT. DETECTED
        DEX
        BNE   scan_nolos_again
chk_loss_debounce_xilinx_exit:
        RTS
```

```
        export chk_los_AIS chk_los_AIS:
          BCLR COMP_FLAG
          BCLR LP_2SEC_DET
 5        LDA #TIME_0SEC              ;set scan time to 0 seconds(2ms)
          STA qualify_time
          BCLR DATA_SEL               ;set to office side
          JSR DET_LOS_CODE             ;GO SET UP GATE ARRAY
          JSR SCAN_QUALIFY             ;CHK IF PATTERN IS BEING RECEIVED
10        BRSET HARD_LOOP,ABORT_CHECK
          BRCLR $COMP_FLAG,chk_prev_nolos_dsx  ;IF COMP LINE IS HIGH THEN PTRN
     DETECTED
          BRSET LOS_DSX_FLAG,dsx_led_los
          JSR chk_loss_debounce_xilinx
15        BRCLR $COMP_FLAG,dsx_led_nolos      ;IF COMP LINE IS HIGH THEN PTRN
     DETECTED
          BSET LOS_DSX_FLAG
     dsx_led_los:
          BCLR NET_LOS_LED            ;turn on LOS led for dsx side
20        BRA chk_fac_los
     chk_prev_nolos_dsx:
          BRCLR LOS_DSX_FLAG,dsx_led_nolos
          JSR chk_loss_debounce_xilinx
          BRSET $COMP_FLAG,dsx_led_los        ;IF COMP LINE IS HIGH THEN PTRN
25   DETECTED
          BCLR LOS_DSX_FLAG
     dsx_led_nolos:
          BSET NET_LOS_LED            ;turn off loss of signal led for dsx side
     chk_fac_los:
30        BCLR COMP_FLAG
          LDA #TIME_0SEC              ;set scan time to 0 seconds(2ms)
          STA qualify_time
          BSET DATA_SEL               ;set to fac side
          JSR DET_LOS_CODE             ;GO SET UP GATE ARRAY
35        JSR SCAN_QUALIFY             ;CHK IF PATTERN IS BEING RECEIVED for 1 sec.
          BRSET HARD_LOOP,ABORT_CHECK
          BRSET $COMP_FLAG,chk_prev_los_span  ;IF HIGH THEN PATTERN DETECTED BRSET LOS_SPAN_FLAG,chk_again 40        JMP chk_span_regen

ABORT_CHECK:
          RTS chk_again:
          JSR chk_loss_debounce_xilinx
45        BRSET $COMP_FLAG,span_led_los       ;IF HIGH THEN PATTERN DETECTED
```

-32-

```
        BCLR LOS_SPAN_FLAG
        BRA  span_led_nolos chk_prev_los_span:                    ;WE SEE LOS, WAS IT HERE BEFORE
        BRSET LOS_SPAN_FLAG,span_led_los  ;YES, SO CONTINUE
5       JSR   chk_loss_debounce_xilinx   ;NO, SO DOUBLE CHECK PATTERN
        BRSET $COMP_FLAG,do_span_los     ;IF HIGH THEN PATTERN DETECTED
        JMP   chk_span_regen             ;PATTERN DROPPED SO LEAVE do_span_los:
        BSET  LOS_SPAN_FLAG
10 span_led_los:
        BCLR  CPE_LOS_LED                ;turn on LOS led for fac side
        BRSET LOOP_FLAG_0,chk_span_ais_sw ;if in lpbk, jmp
   clr_terms:                            ;cpe loss
        BRCLR OFC_TERM,chk_clrcpe
15      LDA   #025D
        JSR   DELAY_WAIT
        BCLR  OFC_TERM
   chk_clrcpe:
        BRCLR CPE_TERM,chk_span_ais_sw
20      LDA   #025D
        JSR   DELAY_WAIT
        BCLR  CPE_TERM chk_span_ais_sw:
                          chk_nonmon_debounce
25      LOS_AIS_SW_N,LOS_AIS_SW_FLAG,NO_LPBK_AIS_SW
        BRCLR LOS_AIS_SW_FLAG,set_span_lpbk  ;jmp if LOS LPBK SW is enabled
        BRA   update_AIS_out set_span_lpbk:
        BRSET LOS_LPBK_OVR,update_AIS_out  ;branch if override enabled
30      BSET  SPAN_AIS                   ;turn on ais
        BRSET LOOP_FLAG_0,update_AIS_out ;if in lpbk, jmp
        BSET  LOS_LPBK_FLAG              ;LOS initiated lpbk
        JSR   OFFICE_ON
                                         ;go into lpbk
        BSET  ARM_FLAG
35      BRA   update_AIS_out span_led_nolos:
   no_los_fac:
        BSET  CPE_LOS_LED                ;turn off loss of signal led for fac side
        BCLR  LOS_LPBK_OVR               ;CLEAR LOS LPBK OVERRIDE
40 NO_OVR_CLR:
        BRSET LOS_LPBK_FLAG,set_terms    ;branch if LOS initiated lpbk
        BRSET LOOP_FLAG_0,clear_span_ais ;if in lpbk, jmp
        BRSET LOS_LPBK_FLAG,update_AIS_out ;if in override, branch BRSET OFC_TERM,chk_setcpe
45      LDA   #025D
```

```
              JSR   DELAY_WAIT
              BSET  OFC_TERM
        chk_setcpe:
              BRSET CPE_TERM,chk_los_AIS_EXIT
  5           LDA   #025D
              JSR   DELAY_WAIT
              BSET  CPE_TERM
              BRA   chk_los_AIS_EXIT      ;do nothing
        set_terms:                         ;no cpe loss
 10           BCLR  LOS_LPBK_FLAG
              JSR   OFFICE_OFF
        clear_span_ais:
              BCLR  SPAN_AIS
              BRSET LOOP_FLAG_0,update_AIS_out   ;if in lpbk, jmp
 15           BRCLR K2_RELAY,update_AIS_out
              BCLR  SK2_RELAY              ;ENERGIZE COIL
              LDA   #050D
              JSR   DELAY_WAIT update_AIS_out:
 20     chk_span_regen:
              JSR   XMT_AIS_xilinx
        chk_los_AIS_EXIT:
              RTS ;-------------------------------------------------
 25     ; SET CONTROL BYTE to XILINX to XMT AIS to both sides
        ;-------------------------------------------------
              export XMT_AIS_xilinx XMT_AIS_xilinx:
              BRSET LOOP_FLAG_0,get_out    ;if in lpbk, jmp
 30           BRCLR SPAN_AIS,set_normal
              BRSET main_ais_override_state,set_normal
              LDA   #AIS_to_dsx_value      ;send AIS to dsx
              STA   GATE_ARRAY_REG2        ;MODIFY HEADER BYTE
              BRA   chk_relay 35     set_normal:
              LDA   #normal_control_value
              STA   GATE_ARRAY_REG2        ;MODIFY HEADER BYTE
        chk_relay:
        chk_clrk2:                         ;normal regen on or sending ais
 40           BRCLR LIS_RELAY,get_out
              LDA   #025D
              JSR   DELAY_WAIT
              BCLR  LIS_RELAY
        get_out:
 45           RTS
```

DEBOUNCES

```
;----------------------------------------------------------------
;   PURPOSE: This routine is a macro that gets assembled within
;       other routines. It checks for a switch to be changed
;       for a period of time before accepting it.
;---------------------------------------------------------------- region "MAIN"
;----------------------------------------------------------------
; macro routine for debounce checking
;----------------------------------------------------------------
chk_debounce:   #macro
chk_man_debounce$$:
    LDA     #015D
    LDX     #0FFH
D_2_LOOP_man_lpbk$$:
    BRSET   $2,$3,chk_no_man_debounce$$ ;JUMP IF line goes non_active
    DEX
    BNE     D_2_LOOP_man_lpbk$$
    DECA
    BEQ     D_2_EXIT_man_lpbk$$
    LDX     #0FFH
    JMP     D_2_LOOP_man_lpbk$$
D_2_EXIT_man_lpbk$$:
    BRA     chk_debounce_EXIT$$     ;return to the caller,success
chk_no_man_debounce$$:              ;line is non_active
    LDA     #020D               ;60 ms debounce time
    LDX     #0FFH               ;
D_2_LOOP_man_lpbk_n$$:
    BRCLR   $2,$3,chk_man_debounce$$    ;JUMP IF line goes active
    DEX
    BNE     D_2_LOOP_man_lpbk_n$$
    DECA
    BEQ     D_2_EXIT_man_lpbk_n$$
    LDX     #0FFH
    JMP     D_2_LOOP_man_lpbk_n$$
D_2_EXIT_man_lpbk_n$$:
    BRA     $1              ;jmp to the caller,fail
chk_debounce_EXIT$$:
    #endm DEFINE.S
        region "ports"
;----------------------------------------------------------------
;----------------------------------------------------------------
#define     POWER_LED   7,APORT ;(O) 1,CONTROLS XILINK RESET LINE
;#define    DONE_PIN    6,APORT ;(I) 0,FOR MONITORING XILINK
#define     LD_SHIFT    5,APORT ;(O) 0,LATCHS 8 BIT WORD TO G.A.
#define     spare_1     4,APORT ;(O) 1,
```

```
        #define   CPE_LOS_LED    3,APORT  ;(O) 1,cpe loss of signal
        #define   spare_2        2,APORT  ;(O) 1,
        #define   NET_LOS_LED    1,APORT  ;(O) 1,network loss of signal
        #define   LIS_RELAY      0,APORT  ;(O) 0,LIS relay 5     #define   DATA_SEL       7,BPORT  ;(O) 0,NOT A  B SELECT LINE
        #define   SER_DATA       6,BPORT  ;(O) 0,SERIAL DATA TO E^2 AND XILINK
        #define   DSEL           5,BPORT  ;(O) 1,data select for u9
        #define   SDOUT          4,BPORT  ;(O) 1,data output for u9
        #define   CLK_INHIBIT    3,BPORT  ;(O) 1,esf clock inhibit
 10     #define   LPBK_LED       2,BPORT  ;(O) 1,lpbk led
        #define   OFC_TERM       1,BPORT  ;(O) 0,office side termination
        #define   CPE_TERM       0,BPORT  ;(O) 0,cpe side termination define   SER_CLK        7,CPORT  ;(O) 1,SERIAL DATA CLK FOR E^2 & XILINK
        #define   ESF_LED        6,CPORT  ;(O) 1,esf framing led
 15     #define   K2_RELAY       5,CPORT  ;(O) 0,lpbk relay
        #define   BPV_IN         4,CPORT  ;(I) 1,BPV
        #define   X_RESET        3,CPORT  ;(O) 1,CONTROLS XILINK RESET LINE
        #define   MANUAL_LBK_O_N 2,CPORT  ;(I) 1,manuel lpbk switch
        #define   CCLK           1,CPORT  ;(O) 1,CLK FOR DOWNLOADING AFTER RESET TO
 20     XILINKS
        #define   bit_193_MCSDATA 0,CPORT ;(O,I) 1,esf bit 193 and mcs file data ouput define   LOS_AIS_SW_N   3,DPORT  ;(I) 1,AIS      0,LPBK
        #define   INBAND_AUTO_SW 4,DPORT  ;(I) 1,INBAND(ALL) 0,AUTO ESF/SF
        ;#define  DSX_REGEN_SW_N 4,DPORT  ;(I) 1,REGEN DSX  0,REGEN disabled
 25     ;--------------------------------------------------------------
        #define   SENDING_ONES   0,FLAG1  ;Placeholder-no longer used
        #define   LOOP_FLAG_O    3,FLAG1  ;office lpbk 0=NONE 1=LOOPBACK ON
        #define   COMP_FLAG      4,FLAG1  ;
        #define   ARM_FLAG       7,FLAG1

30     #define   sf_rcv_arming  0,SF_CURRENT_STATE
        #define   sf_rcv_lpdwn   1,SF_CURRENT_STATE define   timeout_flag   2,FLAG3
        #define   LP_2SEC_DET    6,FLAG3  ;Set when loopup code has been
                                          ;qualified for 3 seconds.
 35     #define   STATE_CHANGE_O 0,FLAG4  ;flag for manuel lpbk buttom
        #define   HARD_LOOP_O    2,FLAG4  ;1= in manuel lpbk toward office
        #define   HARD_LOOP      4,FLAG4  ;1= manuel lpbk buttoms are pressed
        #define   man_lpbk_O     5,FLAG4 define   LOS_AIS_SW_FLAG 0,FLAG5 ;1=LOS_AIS_SW is enable
 40     #define   LOS_LPBK_FLAG  1,FLAG5  ;1=LOS INITIATED LPBK
        #define   LOS_DSX_FLAG   2,FLAG5  ;1=LOSS of SIG form DSX
        #define   LOS_SPAN_FLAG  3,FLAG5  ;1=LOSS of SIG form SPAN
        #define   INBAND_AUTO_FLAG 4,FLAG5 ;1=AUTO DETECTION else INBAND(all)
        ;define   DSX_REGEN_FLAG 4,FLAG5  ;1=REGEN DSX SIG
 45     #define   SPAN_AIS       5,FLAG5  ;1=require to send AIS to DSX
```

-36-

```
#define    LOS_LPBK_OVR     6,FLAG5    ;1=LOS LPBK OVERRIDE
define    DL_16BITS_FLAG   7,FLAG5    ;=1=check loop codes until 16 DL define    ERR_CNT0   7,GATE_ARRAY_REG2   ;error count of control byte to xilinx
define    ERR_CNT1   6,GATE_ARRAY_REG2   ;error count of control byte to xilinx
#define    ERR_CNT2   5,GATE_ARRAY_REG2   ;error count of control byte to xilinx
#define    ERR_CNT3   4,GATE_ARRAY_REG2   ;error count of control byte to xilinx
#define    ERR_CNT4   3,GATE_ARRAY_REG2   ;error count of control byte to xilinx
#define    CONT_C     2,GATE_ARRAY_REG2   ;C cross bit of control byte to xilinx
#define    CONT_B     1,GATE_ARRAY_REG2   ;B FAC bit of control byte to xilinx
define    CONT_A     0,GATE_ARRAY_REG2   ;A DSX bit of control byte to xilinx define    power_on_bit    0,power_byte    ;I bit to xilinx
define    span_cutoff     1,power_byte    ;I bit to xilinx define    main_ais_state           1,main_current_state
define    main_ais_override_state  0,main_current_state
define    main_in_lpbk_state       2,main_current_state define    ESF_ARM_DET    0,ESF_CURRENT_STATE  ;1=rcv esf lpup code
define    ESF_DWN_DET    1,ESF_CURRENT_STATE  ;1=rcv esf lpdn code
define    get_esf_lpbk   7,ESF_CURRENT_STATE  ;receive esf lpbk codes flag define    ignore_esf_lpup   0,ESF_IGNORE_STATE  ;1=ignore esf lpup code
define    ignore_esf_lpdn   1,ESF_IGNORE_STATE  ;1=ignore esf lpdn code
define    ignore_esf_code   7,ESF_IGNORE_STATE  ;1=ignore esf lpbk code ;----------------------------------------------------------------
; MASK BIT FOR TIMER CAPTURE INTERRUPT  0 = INTERRUPT DISABLED (OFF)
;          1 = INTERRUPT ENABLED    (ON)
;
#define    ICR_INT_BIT   7,TCR    ;INTERRUPT MASK BIT FOR TIMER CAPTURE
#define    IRQ_BIT       1,OPTION ;
;----------------------------------------------------------------

EQU.S
;****************************************************************
;*         PORT-I/O-TIMER ASSIGNMENTS                    *
;****************************************************************

APORT    DS  1   ;0 PORT A DATA REGISTER
BPORT    DS  1   ;PORT B DATA REGISTER
CPORT    DS  1   ;PORT C DATA REGISTER
DPORT    DS  1   ;PORT D DATA REGISTER
```

-37-

```
        ADDR      DS  1  ;PORT A DATA DIRECTION REGISTER
        BDDR      DS  1  ;PORT B DATA DIRECTION REGISTER
        CDDR      DS  1  ;PORT C DATA DIRECTION REGISTER
                  DS  1  ;UNUSED
                  DS  1  ;UNUSED
                  DS  1  ;UNUSED
        SPCR      DS  1  ;A SERIAL PERIPHERAL CONTROL REGISTER
        SPSR      DS  1  ;SERIAL PERIPHERAL STATUS REGISTER
        SPDR      DS  1  ;SERIAL PERIPHERAL DATA I/O REGISTER
        SCBRR     DS  1  ;SERIAL COMM. BAUD RATE REGISTER
        SCCR1     DS  1  ;SERIAL COMM. CONTROL REGISTER 1
        SCCR2     DS  1  ;SERIAL COMM. CONTROL REGISTER 2
        SCSR      DS  1  ;10 SERIAL COMM. STATUS REGISTER
        SCDR      DS  1  ;SERIAL COMM. DATA REGISTER
        TCR       DS  1  ;TIMER CONTROL REGISTER
        TSR       DS  1  ;TIMER STATUS REGISTER
        ICHR      DS  1  ;INPUT CAPTURE HIGH REGISTER
        ICLR      DS  1  ;INPUT CAPTURE LOW REGISTER
        OCHR      DS  1  ;OUTPUT COMPARE HIGH REGISTER
        OCLR      DS  1  ;OUTPUT COMPARE LOW REGISTER
        CHR       DS  1  ;18 COUNTER HIGH REGISTER
        CLR       DS  1  ;COUNTER LOW REGISTER
        ACHR      DS  1  ;ALTERNATE COUNTER HIGH REGISTER
        ACLR      DS  1  ;ALTERNATE COUNTER LOW REGISTER
        PR        DS  1  ;PROGRAM REGISTER
        COPRR     DS  1  ;COP RESET REGISTER
        COPCR     DS  1  ;COP CONTROL REGISTER

;************************************************************
;*              TIMER LABLES                        *
;************************************************************
;
;*              1MS TIMERS                          *
;************************************************************
;
        TMR1      DS  1  ;
        TMR2      DS  1  ;
        TMR3      DS  1  ;
        MS_COUNTER   DS  1
        TIMEOUT_H    DS  1  ;Arming code fail-safe timeout
        TIMEOUT_L    DS  1  ;Arming code fail-safe timeout
;************************************************************
;*              100MS TIMERS                        *
;************************************************************
;
;*              1 MIN. TIMER                        *
;************************************************************
;
;*              FLAGS                               *
;************************************************************
```

-38-

```
        FLAG1           DS   1
        SF_CURRENT_STATE    DS   1
        FLAG3           DS   1
        FLAG4           DS   1
 5      FLAG5           DS   1
        main_current_state  DS   1
        ESF_CURRENT_STATE   DS   1
        ESF_IGNORE_STATE    DS   1
        ;**********************************************************
10      ;*              BUFFERS AND POINTERS                      *
        ;********************************************************** px_count        DS   1
        qualify_time    DS   1
        ;DL_CNT         DS   1
15      NONERR_CNT      DS   1
        SHFT_CNT        DS   1
        XTEMP0          DS   1   ;TEMP BUFFER FOR X REG DURING PROCESS
        XTEMP1          DS   1   ;TEMP BUFFER FOR X REG DURING DELAY
        XTEMP2          DS   1   ;TEMP BUFFER FOR X REG DURING DELAY2
20      TIMERCT         DS   1   ;
        TIMERADD        DS   1   ;TIMER ADDRESS POINTER
        TIMERADD2       DS   1   ;TMP BUF FOR TIMERADD DURING INTERRUPT
        OCRTEMPLO       DS   1   ;TMP BUF FOR TIMERADD FOR INTER.
        PREVIOUS        DS   1
25      TMR_U           DS   1
        TMR_L           DS   1
        INT_CNT         DS   1
        X_BYTE          DS   1   ;TMP STORAGE FOR XILINK DATA
        X_CNT           DS   1   ;COUNTER USED IN XILINK.S
30      ERROR_CNT       DS   1
        SEARCH_TMR      DS   1
        BIT_LEN         DS   1
        BLK_CNT         DS   1
        DET_PATTERN     DS   1
35      DET_PATTERN_2   DS   1
        GEN_PATTERN     DS   1
        SCAN_TMR        DS   1
        ERR_DATA_U      DS   1
        ERR_DATA_L      DS   1
40      PRE_ICHR        DS   1
        PRE_ICLR        DS   1
        RST_ICHR        DS   1
        RST_ICLR        DS   1
        DL_DATA_U       DS   1
45      DL_DATA_L       DS   1
        CNT_U           DS   1
        CNT_L           DS   1
        xmt_xilinx_buffer   DS   4
        power_byte          equ  xmt_xilinx_buffer
50      GATE_ARRAY_REG2     equ  xmt_xilinx_buffer+1
```

```
        RPTR_ADDR.        DS   1
        temp_buffer       DS   1
        bit_error_timer   DS   1
        esf_debounce_count DS  1       ;debounce counter for esf lpbk code
5       ESF_CURRENT_CODE  DS   1       ;storage for esf current rcvd code
        DL_BYTE_COUNTER   DS   1       ;ESF DL BYTE COUNTER
        DL_BIT_COUNTER    DS   1       ;ESF DL bit COUNTER ;****************************************************************
;*                SET TIMER CONTSANTS                           *
10      ;****************************************************************

RESOL100   EQU 64H       ;CONSTANT FOR 100 RESOLUTION TIMERS
        RESOL10    EQU 0AH       ;CONSTANT FOR 10 RESOLUTION TIMERS
        RESOL40    EQU 28H       ;CONSTANT FOR 40 RESOLUTION TIMERS
15      TCV        EQU 07H       ;TIMER CONTROL REG. CONFIG. VAULE
        TSV        EQU 07H       ;TIMER DATA REGISTER START VAULE
        MOR        EQU 10H       ;INTERRUPT MASK VALUE
        LOWTIMERVAL EQU 064H     ;LOW VALUE FOR INT. COUNTER
        HIGHTIMERVAL EQU 000H    ;HIGH VALUE 0FBHEQU251EQU1 MS EMULATOR
20      OPTION     EQU 1FDFH

TMR1_value  EQU 04H       ;1 ms timer
        TMR2_value  EQU 0C7H      ;199d, 200 ms timer
        TMR3_value  EQU 050D      ;10s timer INT_CNT_value    EQU 10D
25      INT_CNT_value_2  EQU 008D    ;for scan routine
        ERROR_CNT_value  EQU 03D
        ERROR_CNT_value_2 EQU 04D    ;for scan routine ;LOOP_TO_TIME_H EQU 00H    ; 20 mins(+- 10s) loop timeout time in minutes
        ;LOOP_TO_TIME_L EQU 0121D  ; 20 mins loop timeout time in minutes
30      LOOP_TO_TIME_H  EQU 00H    ; 30 mins(+- 10s) loop timeout time in minutes
        LOOP_TO_TIME_L  EQU 0181D  ; 30 mins loop timeout time in minutes
        ARM_TO_TIME_H   EQU 002H   ; 2 hrs(+- 10s) Arm timeout time in minutes
        ARM_TO_TIME_L   EQU 0D1H   ; 2 hrs Arm timeout time in minutes
        CNT_DWN_2SEC    EQU 10D    ; Value to compare with SCAN_TMR to see if
35                                 ; 2 seconds have passed.

TIME_4SEC     EQU 020D   ;4 seconds counter
        TIME_3SEC     EQU 015D   ;3 seconds counter
        TIME_2SEC     EQU 010D   ;2 seconds counter
        TIME_1SEC     EQU 05D    ;1 seconds counter
40      TIME_400MS    EQU 02D    ;400 mseconds counter
        TIME_46000MS  EQU 02D    ;46000 mseconds counter
        TIME_0SEC     EQU 0D     ;0 seconds counter
        TIME_150MS    EQU 75D    ;150 mseconds counter

RAM_START   EQU 050H
```

```
        RAM_END      EQU 0BFH
        TCR_MASK     EQU 040H    ;THIS VALUE DISABLES THE INTERRUPTS
                                 ;AND SETS TCAP PIN FOR NEG. GOING EDGE

NONERR_THRES EQU 006D

5       ESF_HEADER      EQU 11111111B  ;ESF message header
        ESF_ARM1_CODE   EQU 00010010B  ;ESF universal arming code
        ESF_ARM2_CODE   EQU 00111100B  ;ESF repeater only arming code
        ESF_DWN1_CODE   EQU 00100100B  ;ESF universal loopdown code
        ESF_DWN2_CODE   EQU 00000110B  ;ESF repeater only loopdown code 10      ;********* 16 bit xilinx code ******

AIS_to_both_value    EQU 11111011B   ;send AIS to both
        AIS_to_fac_value     EQU 11111001B   ;send AIS to fac
        AIS_to_dsx_value     EQU 11111010B   ;send AIS to DSX
        normal_control_value EQU 11111000B
15      ;LIS_to_dsx_value    EQU 11111101B   ;send LIS to office
        ;LIS_to_fac_value    EQU 11111110B   ;send LIS to fac
        LIS_to_dsx_value     EQU 11111110B   ;send LIS to office
        LIS_to_fac_value     EQU 11111101B   ;send LIS to fac
        lpbk_no_LIS_value    EQU 11111100B   ;lpbk with no LIS to fac(los lpbk)
20      ARM_CODE             EQU 11000110B   ;arming code 1 for 16 bits
        ARM_CODE_2           EQU 00110001B   ;arming code 2 for 16 bits
        ;ARM_CODE_CSU        EQU 10000010B   ;arming code 1 for 16 bits
        ;ARM_CODE_2_CSU      EQU 00001000B   ;arming code 2 for 16 bits
        LP_DWN_CODE          EQU 11100111B   ;all lpdn + disarm
25      LP_DWN_CODE_2        EQU 00111001B   ;all lpdn + disarm
        QUERY_CODE           EQU 11010101B   ;query code to require for sending error count
        LOS_CODE             EQU 00000000B   ;loss of signal code 1 for 16 bits
        LOS_CODE_2           EQU 00000000B   ;loss of signal code 2 for 16 bits main_normal_state_value   EQU 00h    ;normal state value in main routine
30      main_ais_state_value      EQU 02h    ;ais state value in main routine
        main_ais_override_value   EQU 01h    ;ais override state value in main routine
        main_in_lpbk_value        EQU 04h    ;in_lpbk state value in main routine lpup_value         EQU       81h     ;indicate esf lpup code rcvd. set bit 0 of
        SF/ESF_CURRENT_STATE
35      lpdn_value         EQU       82h     ;indicate esf lpdn code rcvd. set bit 1 of
        SF/ESF_CURRENT_STATE DL_BYTE_COUNT  EQU 003H        ;DL BYTE COUNTER RELOAD VAULE
        ;***********************************************************
        ;*        DEFINE INTERRUPTS VECTORS                        *
40      ;***********************************************************
```

```
        region "vectors"

#define    UNUSED  2

DW  UNUSED
5       DW  READ1      ;SERIAL COMMUNICATIONS    (1FF6)
        DW  INT_TMR    ;TIMER INTURRUPT VECTOR   (1FF8)
        DW  IRQ        ;IRQ INTERRUPT VECTOR     (1FFA)
        DW  UNUSED
        DW  START      ;RESET INTERRUPT VECTOR   (1FFE)

10                             ESF_SUB.S list"off"
    #include    define.s
    #include    esf_def.h
            list"on"

15      export frame_seek_state
        export state_variable region0 "ramdata"

slip_variable  DS   1
        state_variable DS   5              ;state variable in state_machine_sub
20      state_1    equ   state_variable+1  ;state variable in start_state_machine
        state_2    equ   state_variable+2  ;state variable in start_state_machine
        state_3    equ   state_variable+3  ;state variable in start_state_machine
        state_4    equ   state_variable+4  ;state variable in start_state_machine
        frame_seek_state DS   1
25      esf_data       DS   1

;-----------------------------------------------------------
    ;Variable storage assigment when the unit is in esf mode
    ;-----------------------------------------------------------
30      ;                              ;R0= state_variable
        ;                              ;R1= esf_data
        prev_bit_error    EQU  state_1  ;R2= 0 if the previous bit is not in error
        prev_frame_error  EQU  state_2  ;R3= 0 if the last frame byte is not in error
        frame_error_count EQU  state_3  ;R4= error counter for every frame byte
35      frame_bit_count   EQU  state_4  ;R5= frame bit counter
        ;                              ;R6= frame_seek_state frame_error_count_value  EQU  04H
        frame_bit_count_value    EQU  06H
```

-42-

```
       #define    SLIP    0,slip_variable    ;slip bit for rountine state_machine_sub
       #define    slip_1  1,slip_variable    ;slip bit for rountine start_state_machine
       #define    slip_2  2,slip_variable    ;slip bit for rountine start_state_machine
       #define    slip_3  3,slip_variable    ;slip bit for rountine start_state_machine
 5     #define    slip_4  4,slip_variable    ;slip bit for rountine start_state_machine
       #define    esf_data_next_bit 2,esf_data         ;new esf bit position ESF_FRAME_VALUE EQU 094H   ;100101
       invalid_state_value EQU 0FFh  ;indicate invalid frame byte received for the state region "MAIN"

10     import DL_DATA_L
       import DL_DATA_U good_state: #macro

BCLR  ESF_FRAME_UP_N          ;5 turn on esf led
15             LDX   frame_seek_state        ;4
               LDA   set_slip_bit_table,X    ;6
               ORA   slip_variable           ;3
               STA   slip_variable           ;4 set slip bit
               CLR   state_variable          ;initial state for esf mode endm 20     slip_bit: #macro

LDX   frame_seek_state        ;3
               STA   state_variable,X        ;4
               LDA   clear_slip_bit_table,X
               AND   slip_variable
25             STA   slip_variable           ;clear slip bit endm export IRQ
       ;       export ESF_FRAMING
       ;_____
30     ;_____
       ;
       ; start of state machine
       ;
       ;_____
35     ;_____
       IRQ:
```

-43-

```
        ESF_FRAMING:

;       BRSET  ESF_FRAME_UP_N,TRY_FRAME_UP  ;if not in esf mode,jmp
            BRCLR  ESF_FRAME_UP_N,was_in_frame   ;if not in esf mode,jmp
            JMP    TRY_FRAME_UP
 5  was_in_frame:
            LDX    state_variable
            LSLX                   ;3 multiply reg X by 2
            JMP    esf_state_table,X   ;4 esf_state_table:              ;3
10          BRA    esf_state_default  ;0 ,initial state
            BRA    esf_state_DLH      ;2 ,DL high byte
            BRA    esf_state_CRC      ;4 ,CRC byte
            BRA    esf_state_DLL      ;6 ,DL low byte
            BRA    esf_state_FRAME    ;8 ,FRMAE byte 15  esf_state_default:
            LDA    #ESF_FRAME_VALUE
            STA    esf_data              ;frame byte
            LDA    #00h
            STA    DL_DATA_L             ;store into DL_DATA_L
20          STA    DL_DATA_U             ;store into DL_DATA_H
            STA    prev_bit_error        ;reset error flag
            STA    prev_frame_error      ;reset error flag
            LDA    #frame_error_count_value
            STA    frame_error_count     ;restore frame error count
25          LDA    #frame_bit_count_value
            STA    frame_error_count     ;restore frame error count
            LDA    #02h
            STA    state_variable
            JMP    ESF_FRAMING_EXIT 30  esf_state_DLH:                       ;check data link bytes
    esf_state_DLL:                       ;check data link bytes
            JSR    ESF_LOOP_DETECT          ;check esf loop code
            INC    state_variable        ;update state variable
            JMP    ESF_FRAMING_EXIT 35  esf_state_CRC:
            INC    state_variable        ;update state variable
            JMP    ESF_FRAMING_EXIT esf_state_FRAME:
            BRCLR  bit_193,esf_bit_193_0    ;5
40          ROL    esf_data              ;update the current frame byte
            BCS    in_frame_bit_1        ;check to see if the new bit is correct
            BCLR   esf_data_next_bit
            BRA    lost_frame            ;the bit is not correct
    esf_bit_193_0:
```

```
              ROL  esf_data                    ;update the current frame byte
              BCC  in_frame_bit_0              ;check to see if the new bit is correct
              BSET esf_data_next_bit
       lost_frame:
  5           LDA  prev_bit_error
              BNE  lost_frame_slip             ;first time of lost bit? if no,jmp
              INC  prev_bit_error              ;yes,first time
              inc  prev_frame_error            ;last frame byte is in error
              DEC  frame_bit_count             ;
 10           TST  frame_bit_count             ;jmp if not new frame byte
              BNE  in_frame
              LDA  #frame_bit_count_value
              STA  frame_bit_count
       frame_byte_in_error:
 15           CLR  prev_frame_error            ;clear flag for last frame byte in error
              DEC  frame_error_count
              TST  frame_error_count           ;4 consecutive frame bytes in error ?
              BNE  in_frame
       lost_frame_slip:
 20           BSET ESF_FRAME_UP_N              ;turn off esf led
              CLR  frame_seek_state            ;set to the initial state for esf framing routine
              JMP  ESF_FRAMING_EXIT in_frame_bit_1:
              BSET esf_data_next_bit           ;store new bit to the next position
 25           BRA  bit_in_frame
       in_frame_bit_0:
              BCLR esf_data_next_bit           ;store new bit to the next position
       bit_in_frame:
              CLR  prev_bit_error
 30           DEC  frame_bit_count             ;
              TST  frame_bit_count
              BNE  in_frame                    ;jmp if new frame byte is not ready
              LDA  #frame_bit_count_value
              STA  frame_bit_count             ;restore frame bit counter
 35           TST  prev_frame_error
              BNE  frame_byte_in_error         ;jmp if previous frame is in error
              LDA  #frame_error_count_value
              STA  frame_error_count           ;restore frame error count
       in_frame:
 40           LDA  #01h
              STA  state_variable              ;update state_variable
              JMP  ESF_FRAMING_EXIT TRY_FRAME_UP:
              LDX  frame_seek_state            ;3 load frame_seek_state
 45           LSLX                             ;3 multiply reg X by 2
              JMP  seek_state_table,X          ;4
```

-45-

```
seek_state_table:              ;3
        BRA    seek_state_default  ;0 ,frame_seek_state = 0
        BRA    seek_state_1        ;2 ,frame_seek_state = 1
        BRA    seek_state_2        ;4 ,frame_seek_state = 2
        BRA    seek_state_3        ;6 ,frame_seek_state = 3
        BRA    seek_state_4        ;8 ,frame_seek_state = 4 seek_state_default:            ;initial esf framing routine
;       BSET  CLK_INHIBIT        ;5
;       BCLR  CLK_INHIBIT        ;5
        LDA   #1EH               ;2
        STA   slip_variable      ;4
        LDA   #00H               ;2
        STA   state_1
        STA   state_2
        STA   state_3
        STA   state_4
        INC   frame_seek_state
        JMP   ESF_FRAMING_EXIT seek_state_1:
        BRSET slip_1,go_state_machine
        INC   frame_seek_state    ;5
        BRA   ESF_FRAMING_EXIT
seek_state_2:
        BRSET slip_2,go_state_machine
        INC   frame_seek_state    ;5
        BRA   ESF_FRAMING_EXIT
seek_state_3:
        BRSET slip_3,go_state_machine
        INC   frame_seek_state    ;5
        BRA   ESF_FRAMING_EXIT
go_state_machine:
        JSR   state_machine_sub   ;6 call state machine
        INC   frame_seek_state    ;5
        BRA   chk_slip_variable   ;3
seek_state_4:
        BRCLR slip_4,update_frame_seek
        JSR   state_machine_sub   ;6 call state machine
update_frame_seek:
        LDA   #01d
        STA   frame_seek_state chk_slip_variable:
        LDA   slip_variable  ;3  check slip bits
        BNE   ESF_FRAMING_EXIT ;3 jmp if one of the state is OK
        BSET  ESF_FRAME_UP_N    ;5 not in esf mode any more
        CLR   frame_seek_state  ;5 ready to slip bit
        BSET  CLK_INHIBIT       ;5
        BCLR  CLK_INHIBIT       ;5
```

-46-

```
ESF_FRAMING_EXIT:
    RTI

;_____
;
;State machine for ESF framing
;50
;
;_____ state_machine_sub:
    LDX   frame_seek_state
    BRCLR bit_193,bit_193_0    ;5
bit_193_1:
    LDX   state_variable,X     ;3 load index state_variable
    LSLX                       ;3 multiply reg X by 2
    JMP   switch_table_1,X     ;load switch_table_1
bit_193_0:
    LDX   state_variable,X     ;3 load index state_variable
    LSLX                       ;3 multiply reg X by 2
    JMP   switch_table_0,X     ;4 load switch_table_0 switch_table_0:                ;3 bit 193 = 0
    BRA   state_var_0_0        ;state_variable = 0
    BRA   state_var_0_1        ;state_variable = 1
    BRA   state_var_0_2        ;state_variable = 2
    BRA   state_var_0_3        ;state_variable = 3
    BRA   state_var_0_4        ;state_variable = 4
    BRA   state_var_0_5        ;state_variable = 5
    BRA   state_var_0_6        ;state_variable = 6
    BRA   state_var_0_7        ;state_variable = 7
    BRA   state_var_0_8        ;state_variable = 8
    BRA   state_var_0_9        ;state_variable = 9
    BRA   state_var_0_10       ;state_variable = 10
    BRA   state_var_0_11       ;state_variable = 11
    BRA   state_var_0_12       ;state_variable = 12
    BRA   state_var_0_13       ;state_variable = 13
    BRA   state_var_0_14       ;state_variable = 14
    BRA   state_var_0_15       ;state_variable = 15
    BRA   state_var_0_16       ;state_variable = 16
    BRA   state_var_0_17       ;state_variable = 17
    BRA   state_var_0_18       ;state_variable = 18
    BRA   state_var_0_19       ;state_variable = 19
    BRA   state_var_0_20       ;state_variable = 20
    BRA   state_var_0_21       ;state_variable = 21
    BRA   state_var_0_22       ;state_variable = 22
    BRA   state_var_0_23       ;state_variable = 23
    BRA   state_var_0_24       ;state_variable = 24
    BRA   state_var_0_25       ;state_variable = 25
```

-47-

```
            BRA    state_var_0_26      ;state_variable = 26
            BRA    state_var_0_27      ;state_variable = 27
            BRA    state_var_0_28      ;state_variable = 28
            BRA    state_var_0_29      ;state_variable = 29
            BRA    state_var_0_30      ;state_variable = 30

BRA    state_var_0_19      ;state_variable = 31
            BRA    state_var_0_20      ;state_variable = 32
            BRA    state_var_0_21      ;state_variable = 33
            BRA    state_var_0_22      ;state_variable = 34
            BRA    state_var_0_23      ;state_variable = 35
            BRA    state_var_0_24      ;state_variable = 36

BRA    state_var_0_31      ;state_variable = 37
            BRA    state_var_0_32      ;state_variable = 38
            BRA    state_var_0_33      ;state_variable = 39
            BRA    state_var_0_34      ;state_variable = 40
            BRA    state_var_0_35      ;state_variable = 41
            BRA    state_var_0_36      ;state_variable = 42

;********************************************
;
;The following statements are reflected to the
;state machine for ESF FRAMING and the input
;bit equals 0
;
;******************************************** state_var_0_0:
     LDA    #01d
     BRA    store_state_var_0
state_var_0_1:
     LDA    #03d
     BRA    store_state_var_0
state_var_0_2:
     LDA    #05d                       ;2
     BRA    store_state_var_0
state_var_0_3:
;    LDA    #03d
     BRA    store_state_var_slip_0
state_var_0_4:
     LDA    #05d
     BRA    store_state_var_0
state_var_0_5:
     LDA    #07d
     BRA    store_state_var_0
state_var_0_6:
     LDA    #09d
     BRA    store_state_var_0
```

-48-

```
state_var_0_7:
;       LDA #03d
        BRA store_state_var_slip_0
state_var_0_8:
;       LDA #05d
        BRA store_state_var_slip_0
state_var_0_9:
        LDA #12d
        BRA store_state_var_0
state_var_0_10:
        LDA #13d
        BRA store_state_var_0
state_var_0_11:
        LDA #14d
        BRA store_state_var_0
state_var_0_12:
;       LDA #03d
        BRA store_state_var_slip_0
state_var_0_13:
;       LDA #07d
        BRA store_state_var_slip_0
state_var_0_14:
        LDA #017d
        BRA store_state_var_0
state_var_0_15:
        LDA #018d
        BRA store_state_var_0
state_var_0_16:
;       LDA #05d
        BRA store_state_var_slip_0
state_var_0_17:
;       LDA #03d
        BRA store_state_var_slip_0
state_var_0_18:
;       LDA #07d
        BRA store_state_var_slip_0
state_var_0_19:
state_var_0_20:
state_var_0_22:
state_var_0_25:
state_var_0_26:
state_var_0_28:
state_var_0_31:
state_var_0_32:
state_var_0_34:
        BRA inc_state_var_0
state_var_0_21:
state_var_0_27:
state_var_0_33:
;       LDA #03d
        BRA store_state_var_slip_0
```

-49-

```
        state_var_0_23:
        state_var_0_29:
        state_var_0_35:
    ;       LDA  #07d
            BRA  store_state_var_slip_0
        state_var_0_24:
        state_var_0_30:
        state_var_0_36:
    ;       LDA  #05d
            BRA  store_state_var_slip_0 store_state_var_0:
            LDX  frame_seek_state
            STA  state_variable,X
            RTS store_state_var_slip_0:
            LDA  #invalid_state_value
            slip_bit
            RTS inc_state_var_0:
            LDX  frame_seek_state
            INC  state_variable,X state_machine_0_EXIT:
            RTS

;************************************************ switch_table_1:                     ;bit 193 = 1
            BRA  state_var_1_0              ;state_variable = 0
            BRA  state_var_1_1              ;state_variable = 1
            BRA  state_var_1_2              ;state_variable = 2
            BRA  state_var_1_3              ;state_variable = 3
            BRA  state_var_1_4              ;state_variable = 4
            BRA  state_var_1_5              ;state_variable = 5
            BRA  state_var_1_6              ;state_variable = 6
            BRA  state_var_1_7              ;state_variable = 7
            BRA  state_var_1_8              ;state_variable = 8
            BRA  state_var_1_9              ;state_variable = 9
            BRA  state_var_1_10             ;state_variable = 10
            BRA  state_var_1_11             ;state_variable = 11
            BRA  state_var_1_12             ;state_variable = 12
            BRA  state_var_1_13             ;state_variable = 13
            BRA  state_var_1_14             ;state_variable = 14
            BRA  state_var_1_15             ;state_variable = 15
            BRA  state_var_1_16             ;state_variable = 16
```

```
        BRA     state_var_1_17      ;state_variable = 17
        BRA     state_var_1_18      ;state_variable = 18
        BRA     state_var_1_19      ;state_variable = 19
        BRA     state_var_1_20      ;state_variable = 20
        BRA     state_var_1_21      ;state_variable = 21
        BRA     state_var_1_22      ;state_variable = 22
        BRA     state_var_1_23      ;state_variable = 23
        BRA     state_var_1_24      ;state_variable = 24
        BRA     state_var_1_25      ;state_variable = 25
        BRA     state_var_1_26      ;state_variable = 26
        BRA     state_var_1_27      ;state_variable = 27
        BRA     state_var_1_28      ;state_variable = 28
        BRA     state_var_1_29      ;state_variable = 29
        BRA     state_var_1_30      ;state_variable = 30

BRA     state_var_1_19      ;state_variable = 31
        BRA     state_var_1_20      ;state_variable = 32
        BRA     state_var_1_21      ;state_variable = 33
        BRA     state_var_1_22      ;state_variable = 34
        BRA     state_var_1_23      ;state_variable = 35
        BRA     state_var_1_24      ;state_variable = 36

BRA     state_var_1_31      ;state_variable = 37
        BRA     state_var_1_32      ;state_variable = 38
        BRA     state_var_1_33      ;state_variable = 39
        BRA     state_var_1_34      ;state_variable = 40
        BRA     state_var_1_35      ;state_variable = 41
        BRA     state_var_1_36      ;state_variable = 42

;*****************************************************
;
;The following statements are reflected to the
;state machine for ESF FRAMING and the input
;bit equals 1
;
;***************************************************** state_var_1_0:
        LDA     #02d
        BRA     store_state_var_1
state_var_1_1:
        LDA     #04d
        BRA     store_state_var_1
state_var_1_2:
        LDA     #06d
        BRA     store_state_var_1
state_var_1_3:
        LDA     #04d
        BRA     store_state_var_1
state_var_1_4:
        LDA     #06d
```

```
            BRA  store_state_var_1
state_var_1_5:
      LDA  #08d
            BRA  store_state_var_1
state_var_1_6:
;     LDA  #06d
            BRA  store_state_var_slip_1
state_var_1_7:
      LDA  #10d                        ;2
      BRA  store_state_var_1
state_var_1_8:
      LDA  #011d
      BRA  store_state_var_1
state_var_1_9:
;     LDA  #08d
      BRA  store_state_var_slip_1
state_var_1_10:
;     LDA  #06d
      BRA  store_state_var_slip_1
state_var_1_11:
;     LDA  #06d
      BRA  store_state_var_slip_1
state_var_1_12:
      LDA  #15d
      BRA  store_state_var_1
state_var_1_13:
      LDA  #16d
      BRA  store_state_var_1
state_var_1_14:
;     LDA  #08d
      BRA  store_state_var_slip_1
state_var_1_15:
;     LDA  #06d
      BRA  store_state_var_slip_1
state_var_1_16:
      LDA  #019d
      BRA  store_state_var_1
state_var_1_17:
      LDA  #015d
      BRA  store_state_var_1
state_var_1_18:
      LDA  #16d
      BRA  store_state_var_1 state_var_1_19:
state_var_1_25:
state_var_1_31:
;     LDA  #06d
      BRA  store_state_var_slip_1
state_var_1_20:
state_var_1_26:
```

-52-

```
state_var_1_32:
;       LDA  #08d
        BRA  store_state_var_slip_1
state_var_1_21:
state_var_1_23:
state_var_1_24:
state_var_1_27:
state_var_1_29:
state_var_1_30:
state_var_1_33:
        BRA  inc_state_var_1
state_var_1_22:
state_var_1_28:
state_var_1_34:
;       LDA  #06d
        BRA  store_state_var_slip_1
state_var_1_35:
        good_state
        BRA  inc_state_var_1
state_var_1_36:
        LDA  #019d
        BRA  store_state_var_1 store_state_var_1:
        LDX  frame_seek_state
        STA  state_variable,X
        RTS store_state_var_slip_1:
        LDA  #invalid_state_value
        slip_bit
        RTS inc_state_var_1:
        LDX  frame_seek_state
        INC  state_variable,X
state_machine_sub_EXIT:
        RTS ;****************************************************************
;****************************************************************
;****************************************************************
;****************************************************************
;****************************************************
;ESF ARMING or LOOPDOWN CODE DETECT
;**************************************************** import  lpup_value,lpdn_value
        import  DL_BYTE_COUNT
```

```
            import0 DL_BIT_COUNTER
            import0 esf_debounce_count,ESF_CURRENT_CODE,DL_BYTE_COUNTER
            import  ESF_LOOP_TABLE
            import0 ESF_CURRENT_STATE,ESF_IGNORE_STATE
 5      ESF_LOOP_DETECT:
            CLC                 ;1st chk what dl bit ='s clear carry bit
            BRCLR   bit_193,DL_00 ;chk level at 0,cport see if =1 or =0
            SEC
        DL_00:
10          ROR     DL_DATA_L
            ROR     DL_DATA_U
            BRSET   HARD_LOOP,EXIT_ESF_LOOP_DET     ;if in manual lpbk,exit
            BRSET   get_esf_lpbk,EXIT_ESF_LOOP_DET  ;if in manual lpbk,exit
            BRCLR   DL_16BITS_FLAG,chk_high_byte    ;JUMP IF BIT COUNTER NOT
15      RUNNING
            DEC     DL_BIT_COUNTER          ;COUNT 16 BIT DL CHUNKS
            TST     DL_BIT_COUNTER
            BNE     EXIT_ESF_LOOP_DET
        chk_high_byte:
20          LDA     DL_DATA_U
            CMP     #ESF_HEADER     ; Start of message (probably 0FFH)
            BEQ     CHK_LOOP_CODE
            BRA     ESF_CODE_STATE_UNKNOWN

EXIT_ESF_LOOP_DET:
25          RTS

;   BRA     EXIT_ESF_LOOP_DET

CHK_LOOP_CODE:
            LDX     DL_DATA_L       ;check esf arming code
            LDX     ESF_LOOP_TABLE,X
30          JMP     esf_jmp_table,X  ;

esf_jmp_table:
            BRA     ESF_CODE_STATE_UNKNOWN  ;ADDR 0
            BRA     ESF_CODE_STATE_UP       ;ADDR 2
            BRA     ESF_CODE_STATE_DN       ;ADDR 4

35      ESF_CODE_STATE_UNKNOWN:                     ;unknown code
            BCLR    DL_16BITS_FLAG
            STX     ESF_CURRENT_CODE
            LDA     #DL_BYTE_COUNT
            STA     DL_BYTE_COUNTER         ;RELOAD DL BYTE COUNTER
40          BRCLR   ignore_esf_code,current_state_unknown
        ;   LDA     #010H
        ;   STA     DL_BIT_COUNTER
            DEC     esf_debounce_count
            TST     esf_debounce_count
```

-54-

```
              BNE       ESF_CODE_STATE_UNKNOWN_EXIT
        BCLR  ignore_esf_code
        RTS
   current_state_unknown:
5       CLR   ESF_IGNORE_STATE
   ESF_CODE_STATE_UNKNOWN_EXIT:
        RTS ESF_CODE_STATE_UP:
        LDA   #010H
10      STA   DL_BIT_COUNTER
        BRCLR ignore_esf_code,esf_dec_up_counter
        BRSET ignore_esf_lpup,esf_load_debounce_up        ;jmp if ignore lpup code
   required
        DEC   esf_debounce_count
15      TST   esf_debounce_count
        BNE   esf_dec_up_counter
        BCLR  ignore_esf_code
        RTS
   esf_load_debounce_up:
20      LDA   #0FFH
        STA   esf_debounce_count
        BRA ESF_CODE_STATE_UP_EXIT esf_dec_up_counter:
        BRCLR DL_16BITS_FLAG,first_time_valid_code
25      CPX   ESF_CURRENT_CODE        ;has to see 5 consecutive codes
        BNE   first_time_valid_code   ;has to see 5 consecutive codes
        DEC   DL_BYTE_COUNTER         ;COUNT 10 LOOP CODE BYTE
        TST   DL_BYTE_COUNTER         ;COUNT 10 LOOP CODE BYTE
        BNE   ESF_CODE_STATE_UP_EXIT  ;COUNT 10 LOOP CODE BYTE
30      LDA   #lpup_value             ;rcv esf lpup codes
        STA   ESF_CURRENT_STATE       ;rcv lpup codes
        LDA   #ignore_lpup_value      ;ignore esf lpup codes
        STA   ESF_IGNORE_STATE        ;ignore esf lpup codes
   ESF_CODE_STATE_UP_EXIT:
35      RTS ESF_CODE_STATE_DN:
        LDA   #010H
        STA   DL_BIT_COUNTER
        BRCLR ignore_esf_code,esf_dec_dn_counter
40      BRSET ignore_esf_lpdn,esf_load_debounce_dn        ;jmp if ignore lpdn code
   required
        DEC   esf_debounce_count
        TST   esf_debounce_count
        BNE   esf_dec_dn_counter
45      BCLR  ignore_esf_code
        RTS
   esf_load_debounce_dn:
        LDA #0FFH
```

```
                STA   esf_debounce_count
                BRA   ESF_CODE_STATE_DN_EXIT esf_dec_dn_counter:
                BRCLR DL_16BITS_FLAG,first_time_valid_code
 5              CPX   ESF_CURRENT_CODE      ;has to see 5 consecutive codes
                BNE   first_time_valid_code ;has to see 5 consecutive codes
                DEC   DL_BYTE_COUNTER       ;COUNT 10 LOOP CODE BYTE
                TST   DL_BYTE_COUNTER       ;COUNT 10 LOOP CODE BYTE
                BNE   ESF_CODE_STATE_DN_EXIT ;COUNT 10 LOOP CODE BYTE
10              LDA   #lpdn_value           ;rcv esf lpdn codes
                STA   ESF_CURRENT_STATE     ;rcv lpdn codes
            ;   LDA   #ignore_lpdn_value    ;ignore esf lpdn codes
                STA   ESF_IGNORE_STATE      ;ignore esf lpdn codes
        ESF_CODE_STATE_DN_EXIT:
15              RTS first_time_valid_code:
                BSET  DL_16BITS_FLAG        ;wait until the next 2 bytes are ready
                LDA   #DL_BYTE_COUNT        ;RELOAD DL BYTE COUNTER
                STA   DL_BYTE_COUNTER       ;RELOAD DL BYTE COUNTER
20              STX   ESF_CURRENT_CODE      ;get original code
                RTS ;**************************************
        ;
        ;Table is used to clear the slip bit
25      ;for the current state
        ;
        ;************************************** clear_slip_bit_table:
30              DB 0FFh,0FDh,0FBh,0F7h,0EFh   ;4=1110 1111, 1=1111 1101
                                              ;2=1111 1011, 3=1111 0111

;**************************************
        ;
        ;Table is used to set the slip bit
35      ;for the current state
        ;
        ;************************************** set_slip_bit_table:
                DB 000h,002h,004h,008h,010h ;4=0001 0000, 1=0000 0010
40                                          ;2=0000 0100, 3=0000 1000

END
```

INT.S

```
;*****************************************************************
;           INTERNAL REAL TIME INTERRUPT
;*****************************************************************

5   INT_TMR:                    ;200 uS interrupt
        LDA  OCLR               ;LOW BYTE OUTPUT COMPARE REG.
        ADD  #LOWTIMERVAL       ;ADD NEXT TIME TO INTERRUPT
        STA  OCRTEMPLO          ;STORE LOW VAL TEMP. TILL UPPER CALC.
        LDA  OCHR               ;HIGH BYTE
10      ADC  #HIGHTIMERVAL      ;TIMER COEFF. HIGH BYTE
        STA  OCHR
        LDA  TSR                ;ACCESS TIMER STATUS REG. CLEARS IT
        LDA  OCRTEMPLO
        STA  OCLR
15      LDA  #55H               ;VALUE FOR WATCHDOG RESET
        STA  COPRR              ;STORE IN COP RESET REGISTER
        LDA  #0AAH              ;VALUE FOR WATCHDOG RESET
        STA  COPRR              ;STORE IN COP RESET REGISTER ;----------------------------------------------------------------
20  ;THIS SECTION FOR ERROR THRESHOLD USES INPUT CAPTURE ON PIN 41
    ;LABELED AS TCAP
;----------------------------------------------------------------
    IC_INT:
        TST  INT_CNT            ;CHK IF CNT=0 DON'T CHK FOR ERR'S
25      BEQ  IC_S00
        BRCLR 7,TSR,NO_ERROR    ;IF CLR <NO ERRORS> DON'T INCREMENT
    ERROR_CNT
        LDA  ICLR               ;A READ OF THIS REG CLR'S FLAG (INPUT CAPTURE)
        INC  ERROR_CNT          ;UPDATE ERROR_CNT INDICATES ERROR HIT
30  NO_ERROR:
        DEC  INT_CNT            ;INDICATE NUMBER OF REAL TIME INTERRUPTS
    IC_S00:

;----------------------------------------------------------------
;***************** END OF 200uS PART OF INTERRUPT ***************
35  ;----------------------------------------------------------------
    ;       BEGIN 1 mS PORTION
;----------------------------------------------------------------

TSTTMR1:
        TST  TMR1               ;<---------- this counter reset to 5
40      BEQ  reload_tmr1        ;
        DEC  TMR1               ;
        JMP  INTEND             ;if 5 interrupts have'nt passed then exit ;****************************************************************
;The following codes are executed every 1 ms
```

-57-

```
        ;************************************************
        reload_tmr1:
                LDA     #TMR1_value        ;reset 1 mS counter
                STA     TMR1

5               TST     MS_COUNTER
                BEQ     test_tmr2
                DEC     MS_COUNTER test_tmr2:
                TST     TMR2               ;test 200ms timer
10              BEQ     reload_tmr2        ;
                DEC     TMR2               ;
                JMP     INTEND
        ;************************************************
        ;The following codes are executed every 200 ms
15      ;************************************************
        reload_tmr2
                LDA     #TMR2_value        ;reset 200 mS counter
                STA     TMR2

TST     SCAN_TMR    ;'SCAN_TMR' used in file 'SUB.S' for controlling
20              BEQ     TSTTMR3     ; amount of time data direction A or B is looked
                DEC     SCAN_TMR    ; at A/B direction controlled by one port line TSTTMR3:
                TST     TMR3               ;test 30 second timer
                BEQ     reload_tmr3
25              DEC     TMR3
                JMP     INTEND ;************************************************
        ;The following codes are executed every 30 seconds
        ;************************************************
30      reload_tmr3:
                LDA     #TMR3_value        ;reset 10S counter
                STA     TMR3

BRSET   timeout_flag,INTEND
                TST     TIMEOUT_L          ;See if this counter is zero
35              BNE     dec_timeout_l      ;It is, so don't decrement it
                TST     TIMEOUT_H
                BEQ     set_timeout_flag   ;timeout
                DEC     TIMEOUT_H
        dec_timeout_l:
40              DEC     TIMEOUT_L
                JMP     INTEND
        set_timeout_flag:
                BSET    timeout_flag
```

```
INTEND:
        RTI   ;<------ EXIT TIMER INTERRUPT

LPBK_TBL.S
;************************************************************
;     PURPOSE: This is a table of the possible ESF data link codes
;              and if we react to them. 000H has no reaction.
;************************************************************

UP_0    EQU    02h        ;loop up code converted index value
        DN_0    EQU    04h        ;loop dn code converted index value export  ESF_LOOP_TABLE region "MAIN"

ESF_LOOP_TABLE:

DB 000H,000H,000H,000H,000H,000H,000H,000H ;00-07
        DB 000H,000H,000H,000H,000H,000H,000H,000H ;08-0F
        DB 000H,000H,UP_0,000H,000H,000H,000H,000H ;10-17  12H
        DB 000H,000H,000H,000H,000H,000H,000H,000H ;18-1F
        DB 000H,000H,000H,000H,DN_0,000H,000H,000H ;20-27  24H
        DB 000H,000H,000H,000H,000H,000H,000H,000H ;28-2F
        DB 000H,000H,000H,000H,000H,000H,000H,000H ;30-37
        DB 000H,000H,000H,000H,000H,000H,000H,000H ;38-3F
        DB 000H,000H,000H,000H,000H,000H,000H,000H ;40-47
        DB 000H,000H,000H,000H,000H,000H,000H,000H ;48-4F
        DB 000H,000H,000H,000H,000H,000H,000H,000H ;50-57
        DB 000H,000H,000H,000H,000H,000H,000H,000H ;58-5F
        DB 000H,000H,000H,000H,000H,000H,000H,000H ;60-67
        DB 000H,000H,000H,000H,000H,000H,000H,000H ;68-6F
        DB 000H,000H,000H,000H,000H,000H,000H,000H ;70-77
        DB 000H,000H,000H,000H,000H,000H,000H,000H ;78-7F
        DB 000H,000H,000H,000H,000H,000H,000H,000H ;80-87
        DB 000H,000H,000H,000H,000H,000H,000H,000H ;88-8F
        DB 000H,000H,000H,000H,000H,000H,000H,000H ;90-97
        DB 000H,000H,000H,000H,000H,000H,000H,000H ;98-9F
        DB 000H,000H,000H,000H,000H,000H,000H,000H ;A0-A7
        DB 000H,000H,000H,000H,000H,000H,000H,000H ;A8-AF
        DB 000H,000H,000H,000H,000H,000H,000H,000H ;B0-B7
        DB 000H,000H,000H,000H,000H,000H,000H,000H ;B8-BF
        DB 000H,000H,000H,000H,000H,000H,000H,000H ;C0-C7
        DB 000H,000H,000H,000H,000H,000H,000H,000H ;C8-CF
        DB 000H,000H,000H,000H,000H,000H,000H,000H ;D0-D7
        DB 000H,000H,000H,000H,000H,000H,000H,000H ;D8-DF
        DB 000H,000H,000H,000H,000H,000H,000H,000H ;E0-E7
        DB 000H,000H,000H,000H,000H,000H,000H,000H ;E8-EF
```

```
            DB 000H,000H,000H,000H,000H,000H,000H,000H  ;F0-F7
            DB 000H,000H,000H,000H,000H,000H,000H,000H  ;F8-FF

MAIN_SUB.S
       ;****************************************************************
    5  ;     This file contains all of the small subroutines which are called
       ;     by the main routines (SCAN,SCAN_QUALIFY,OFFICE_ON,OFFICE_OFF,etc)
       ;****************************************************************
       SCAN:

BCLR  $COMP_FLAG           ;INDICATE BAD COMPARE
   10       BRSET HARD_LOOP,SCAN_END   ;if in manual lpbk,do not scan data
            LDA   #INT_CNT_value       ;2 ms delay
            JSR   DELAY_US_WAIT CLR   ERROR_CNT
            LDA   #INT_CNT_value       ;CHK FOR 10 CLEAN INTERRUPTS IN A ROW.
   15       JSR   DELAY_US_WAIT
            LDA   ERROR_CNT
            CMP   #ERROR_CNT_value
            BHI   S2_02
            JMP   ERR_THRES2           ;SINCE PATTERN HAS BEEN DETECTED GO
   20                                  ;TO 5 SEC CHK
       S2_02:
            BCLR  $COMP_FLAG           ;INDICATES PATTERN DET. BAD <NO COMPARE>
            JSR   chk_manual_lpbk
       SCAN_END:
   25       RTS

;_____

EXPORT SCAN_QUALIFY
       SCAN_QUALIFY:

30       BCLR  $COMP_FLAG           ;INDICATE BAD COMPARE
            BRSET HARD_LOOP,SCAN_END   ;if in manual lpbk,do not scan data
            LDA   #INT_CNT_value       ;2 ms delay
            JSR   DELAY_US_WAIT CLR   ERROR_CNT            ;incremented in interrupt every time
   35                                  ;error occurs
            LDA   #INT_CNT_value       ;CHK FOR 10 CLEAN INTERRUPTS IN A ROW.
            JSR   DELAY_US_WAIT
            LDA   ERROR_CNT            ;
            CMP   #ERROR_CNT_value     ;
   40       BHI   S3_02                ;if number of errors detected exceeds
                                       ;4 then no good
            LDA   qualify_time         ;load time for qualify from buffer
```

-60-

```
            BNE   store_scan_time
            BSET  $COMP_FLAG         ;INDICATES PATTERN DET. BAD <NO COMPARE>
            RTS store_scan_time:
            STA   SCAN_TMR
            JMP   ERR_CONT1           ;go to check for qualify
        S3_02:
            BCLR  $COMP_FLAG          ;INDICATES PATTERN DET. BAD <NO COMPARE>
            JSR   chk_manual_lpbk
            RTS
        ;----------------------------------------------------------------
        ; MUST MEET ERROR THRESHOLD AND 5 SEC TIME BEFORE ACCEPTING AS CODE
        ;----------------------------------------------------------------
        ERR_THRES2:
            JSR   SET_TIME_OUT        ;WAIT 5 SEC FOR PATTERN DETECTION TIME
            BRCLR SENDING_ONES,ERR_CONT1  ;If sending all 1s, change
                                      ;detect time to 3 seconds
            JSR   SET_TIME_OUT2
        ERR_CONT1:
            LDA   #INT_CNT_value_2    ;CHK FOR 10 CLEAN INTERRUPTS IN A ROW.
            STA   INT_CNT
            CLR   ERROR_CNT           ;RESET ERROR COUNTER
        DET_WT3:
            BRSET HARD_LOOP,SCAN_RET
            BRCLR LP_2SEC_DET,CHECK_5 ;See if we're looking for a
                                      ;loopup address
                                      ;We are, so
            LDA   SCAN_TMR            ;see if address is qualified for 2 seconds
            CMP   #CNT_DWN_2SEC
            BHI   CHECK_5
            BCLR  LP_2SEC_DET         ;Reset the flag, so you don't keep writing
                                      ;to the gate array
            BSET  SENDING_ONES        ;Indicate to scan timer we've already
                                      ;qualified for 2 seconds.
            CLR   ERROR_CNT           ;prevent errors for turning on relay
        CHECK_5:
            TST   SCAN_TMR
            BEQ   DET_EXIT3           ;IF SCAN_TMR TIMES OUT: INDICATES
                                      ;PATTERN GOOG FOR 5 SEC'S
            TST   INT_CNT             ;IF NOT TIMED OUT CHK IF 10 INTERRUPTS
                                      ;HAVE PASSED
            BNE   DET_WT3
            LDA   ERROR_CNT           ;IF 10 INTERRUPTS HAVE PASSED CHK HOW
                                      ;MANY ERRS OCCURED
            CMP   #ERROR_CNT_value_2
            BHI   SCAN_EXIT           ;IF MORE THEN 4 THEN BAD NOT GOOD EXIT
            LDA   #INT_CNT_value_2    ;CHK FOR 10 CLEAN INTERRUPTS IN A ROW.
            STA   INT_CNT
            CLR   ERROR_CNT           ;RESET ERROR COUNTER
```

```
            JSR   chk_manual_lpbk
            JMP   DET_WT3
        DET_EXIT3:
            BSET  $COMP_FLAG           ;EXIT AND INDICATE GOOD COMPARE
        SCAN_EXIT:
            JSR   chk_manual_lpbk
        SCAN_RET:
            RTS ;***********************************************************
        ; lpbk toward office/span side
        ;-----------------------------------------------------------
        OFFICE_ON:
            BSET  $LOOP_FLAG_O         ;INDICATE LPBK ACTIVE
            BCLR  $LPBK_LED            ;turn on office lpbk led BSET  $K2_RELAY            ;ENERGIZE COIL
            LDA   #050D
            JSR   DELAY_WAIT BSET  $LIS_RELAY           ;ENERGIZE COIL
            LDA   #060D
            JSR   DELAY_WAIT BCLR  $OFC_TERM            ;ENERGIZE COIL
            LDA   #050D
            JSR   DELAY_WAIT BCLR  $CPE_TERM            ;ENERGIZE COIL
            LDA   #050D
            JSR   DELAY_WAIT LDX   #000D
            BRSET LOS_LPBK_FLAG,NO_LIS   ;if doing LOS lpbk don't send LIS
            LDA   #LIS_to_fac_value    ;SEND AIS to CPE
            BRA   SET_IT
        NO_LIS:
            BCLR  span_cutoff          ;turn off output towards CPE
            LDA   #lpbk_no_LIS_value   ;Do lpbk with no AIS towards CPE
        SET_IT:
            STA   GATE_ARRAY_REG2,X    ;store value in gate array register
            JSR   LOAD_GATE_ARRAY      ;write registers to gate array
            LDA   #02D
            JSR   DELAY_WAIT
            LDA   #main_normal_state_value
            STA   main_current_state
            RTS ;-----------------------------------------------------------
        ;-----------------------------------------------------------
```

```
OFFICE_OFF:
    BCLR  $LOOP_FLAG_O        ;indicate LPBK inactive
    BSET  $LPBK_LED           ;turn off office lpbk led

BCLR  $K2_RELAY           ;ENERGIZE COIL
    LDA   #050D
    JSR   DELAY_WAIT

BCLR  $LIS_RELAY          ;ENERGIZE COIL
    LDA   #050D
    JSR   DELAY_WAIT

BSET  $OFC_TERM           ;ENERGIZE COIL
    LDA   #050D
    JSR   DELAY_WAIT

BSET  $CPE_TERM           ;ENERGIZE COIL
    LDA   #050D
    JSR   DELAY_WAIT

LDA   #main_normal_state_value
    STA   main_current_state

BSET  span_cutoff         ;turn on output towards CPE
    RTS

;-----------------------------------------------------------
;   MSECONDS DELAY ROTUINE
;   USE MS_COUNTER
;-----------------------------------------------------------
DELAY_WAIT:
    STA   MS_COUNTER          ;STORE VALUE INTO MS TIMER
DELAY_LOOP:
    TST   MS_COUNTER          ;WAIT FOR TIMER TO DECREMENT TO ZERO
    BNE   DELAY_LOOP
    RTS                       ;EXIT DELAY

;-----------------------------------------------------------
;
;   INT_CNTx200 micro seconds dealy
;
;-----------------------------------------------------------

DELAY_US_WAIT:
    STA   INT_CNT
DELAY_US_LOOP:
    TST   INT_CNT             ;WAIT FOR TIMER TO DECREMENT TO ZERO
    BNE   DELAY_US_LOOP
    RTS                       ;EXIT DELAY
```

-63-

```
;----------------------------------------------------------------
;DELAY LOOP USED BEFORE INTERRUPT IS TURNED ON
;----------------------------------------------------------------
DELAY_2:
    LDA  #05AH
    LDX  #0FFH
D_2_LOOP:
    DEX
    BNE  D_2_LOOP
    DECA
    BEQ  D_2_EXIT
    LDX  #0FFH
    JMP  D_2_LOOP
D_2_EXIT:
    RTS
;----------------------------------------------------------------
;----------------------------------------------------------------
SET_SCAN_TIME:              ;SET SCAN TIME TO 10 SEC'S
    LDA  #050D
    STA  SCAN_TMR
    RTS
;----------------------------------------------------------------
SET_SCAN_TIME2:             ;SET SCAN TIME TO 40 SEC'S
    LDA  #0200D
    STA  SCAN_TMR
    RTS
;----------------------------------------------------------------
SET_TIME_OUT:               ;SET SCAN TIME TO 5 SEC'S
    LDA  #025D
    STA  SCAN_TMR
    RTS
;----------------------------------------------------------------
SET_TIME_OUT2:              ;SET SCAN TIME TO 3 SEC'S
    LDA  #015D
    STA  SCAN_TMR
    RTS
;----------------------------------------------------------------
SET_LOOP_TIMEOUT:
    LDA  #LOOP_TO_TIME_H    ;?? mins timeout
    STA  TIMEOUT_H
    LDA  #LOOP_TO_TIME_L
    STA  TIMEOUT_L
    BCLR timeout_flag       ;enable loop timeout
    BCLR timeout_disable    ;enable loop timeout
    BCLR rcv_tmout_disable  ;enable loop timeout
    RTS ;----------------------------------------------------------------
;****************************************************************
;****************************************************************
;****************************************************************
```

```
        DET_ARM_CODE:
            LDA  #ARM_CODE       ;PUT IN PATTERN FOR ARMING CODE
            STA  DET_PATTERN     ;PRE LOAD DET_PATTERN VALUE
            LDA  #ARM_CODE_2     ;PUT IN PATTERN FOR ARMING CODE
 5          STA  DET_PATTERN_2   ;PRE LOAD DET_PATTERN VALUE
            JSR  RCV_DETECT      ;MODIFY GATE_ARRAY_REG
            RTS

DET_LPDWN_CODE:
            LDA  #LP_DWN_CODE    ;LOOP DWN CODE
10          STA  DET_PATTERN     ;PRE LOAD DET_PATTERN VALUE
            LDA  #LP_DWN_CODE_2  ;LOOP DWN CODE
            STA  DET_PATTERN_2   ;PRE LOAD DET_PATTERN VALUE
            JSR  RCV_DETECT      ;MODIFY GATE_ARRAY_REG
            RTS

15      ;************************************
        ; loss of signal
        ;************************************

DET_LOS_CODE:
            LDA  #LOS_CODE       ;PUT IN PATTERN FOR LOS CODE
20          STA  DET_PATTERN     ;PRE LOAD DET_PATTERN VALUE
            LDA  #LOS_CODE_2     ;PUT IN PATTERN FOR LOS CODE
            STA  DET_PATTERN_2   ;PRE LOAD DET_PATTERN VALUE
            JSR  RCV_DETECT      ;MODIFY GATE_ARRAY_REG
            RTS

25      ;----------------------------------------------------------------

;----------------------------------------------------------------
            export LOOP_DWN LOOP_DWN:
30          JSR  OFFICE_OFF      ;TURN OFF ALL LOOP BACKS
            JSR  chk_los_AIS
            JSR  LOAD_GATE_ARRAY
            LDA  #10D
            JSR  DELAY_WAIT
35          BCLR HARD_LOOP_O     ;turn manual lpbk flag off
            RTS
        ;***********************************************************
        ;***********************************************************
        ;***********************************************************
40      ;----------------------------------------------------------------
        ;This section loads the pattern to be detected into registers to sent to the
        ;gate array
        ;----------------------------------------------------------------
        ;----------------------------------------------------------------

45      RCV_DETECT:
```

-65-

```
        LDA  DET_PATTERN
        LDX  #001D
        STA  GATE_ARRAY_REG2,X   ;BYTE 1 IN RAM MAP GATE ARRAY DESIGN
        LDA  DET_PATTERN_2
5       LDX  #002D
        STA  GATE_ARRAY_REG2,X   ;BYTE 2 IN RAM MAP GATE ARRAY DESIGN
        JSR  LOAD_GATE_ARRAY
        RTS

;************************************************
10      ;
;************************************************

LOAD_GATE_ARRAY:         ;load shift line is low for xilinx to load,
           LDA  #03D             ;wait 600us for xilinx to get ready
           JSR  DELAY_US_WAIT
15         CLR  SHFT_CNT         ;high when not loading data to gate array
                                 ;this is necessary for xilinx to process t1
                                 ;data properly
           BCLR $LD_SHIFT        ;low to chip select
        LOAD570X:
20      SHFT_LOOP2:
           LDX  SHFT_CNT         ;
           LDA  xmt_xilinx_buffer,X  ;load config data for gate array design
           JSR  SND_DATA_8       ;go and shift bits out
           INC  SHFT_CNT         ;
25         LDA  SHFT_CNT         ;
           CMP  #004D            ;map is 8 bits by 4 reg's (4 control reg)
           BNE  SHFT_LOOP2       ;chk if last reg. data has been shipped
        SHFT_EXIT:
           BSET $LD_SHIFT
30         RTS
;****************************************************************
;****************************************************************
;****************************************************************
        SND_DATA:                ;clk out 0 or 1 on serial port
35         BCC  SND_ZERO
           BSET $SER_DATA
           BSET $SER_CLK
           BCLR $SER_CLK
           RTS
40      SND_ZERO:
           BCLR $SER_DATA
           BSET $SER_CLK
           BCLR $SER_CLK
           RTS
45      ;-----------------------------------------------------------------
        ;-----------------------------------------------------------------
        ;-----------------------------------------------------------------
        SND_DATA_8:              ;send 8 bits out serial port
           LDX  #008D
```

```
        SD8_LP:
            LSLA
            JSR   SND_DATA         ;PULSE DATA TO G.A.
            DEX
            BNE   SD8_LP
            RTS
```

OFFICFAC.S

```
;****************************************************************
;     PURPOSE: These routines check for loopup or loopdown codes including
;              the flags set by the ESF Data Link checker
;****************************************************************

;-------------------------------------------------------------
;     Check status of a switch
;-------------------------------------------------------------
chk_nonmon_debounce:    #macro
    BRSET $1,$2,chk_SW_LOW$$
    BRSET $3,$4,chk_nonmon_debounce_EXIT$$   ;jmp if SW is disable(active low)
    BRA   chk_SW_debounce$$                  ;jmp with no change in SW and it is enable
chk_SW_LOW$$:                        ;SW is deactive
    BCLR  $3,$4,chk_nonmon_debounce_EXIT$$   ;jmp with no change in SW and it is disable
chk_SW_debounce$$:
    chk_debounce $5,$1,$2            ;switch changed,50 ms debounce checking
    BSET  $3,$4                      ;switch is qualified to be active
    BRA   chk_nonmon_debounce_EXIT$$
$5:                                  ;SW is disable  after checking
    BCLR  $3,$4                      ;switch is qualified to be deactive
chk_nonmon_debounce_EXIT$$:
    #endm ;********************************************
;
;check loopdown code
;
;******************************************** export check_loopdown_code check_loopdown_code:
                ;chk_nonmon_debounce
    INBAND_AUTO_SW,INBAND_AUTO_FLAG,NOT_AUTO
    BCLR  COMP_FLAG
    BCLR  LP_2SEC_DET BRSET ESF_LED,chk_inband_lpdn
    BRCLR get_esf_lpbk,chk_ia_flag   ;Check if ESF loopdown has
    BRSET $ESF_DWN_DET,esf_DWN_CODE_DET  ;been detected
```

-67-

```
chk_ia_flag:
        BRCLR INBAND_AUTO_FLAG,chk_loopdown_exit  ;IN AUTO MODE, GET OUT
chk_inband_lpdn:
        LDA  #TIME_1SEC             ;set scan time to 1 second
        STA  qualify_time
        BCLR $DATA_SEL              ;Force repeater to the DSX side
        JSR  DET_LPDWN_CODE         ;Look for the usual loopdown codes
        JSR  SCAN_QUALIFY
        BRCLR $COMP_FLAG,clr_loopdown_flag   ;CHECK IF 1ST COMP IS MADE
        BCLR COMP_FLAG              ;we see loopdown code
        BRSET ESF_LED,check_1
        BRCLR INBAND_AUTO_FLAG,chk_loopdown_exit ;IN AUTO MODE, GET OUT
check_1:
        BRSET sf_rcv_lpdwn,chk_loopdown_exit  ;jmp if still rcv previous codes
        LDA  #TIME_4SEC             ;set scan time to 4 seconds
        STA  qualify_time
        JSR  SCAN_QUALIFY
        BRCLR $COMP_FLAG,clr_loopdown_flag    ;CHECK IF 1ST COMP IS MADE
        CLR  SF_CURRENT_STATE       ;clr rcv flags for other codes
        BSET sf_rcv_lpdwn           ;rcv loopdown code
        BRA  chk_loopdown_exit
clr_loopdown_flag:
        BCLR sf_rcv_lpdwn           ;not rcv loopdown code any more
        BRA  chk_loopdown_exit
clr_main_rcv_state_lpdwn:
        CLR  SF_CURRENT_STATE       ;clr rcv flags for other codes
        BRA  chk_loopdown_exit
esf_DWN_CODE_DET:
        BSET COMP_FLAG              ;we see loopdown code
        CLR  ESF_CURRENT_STATE      ;start running esf lpbk det rountine
chk_loopdown_exit:
        RTS ;************************************************************
;
;chk arming code(actually this is checking for loopup code)
;
;************************************************************ chk_arming:
        chk_nonmon_debounce  INBAND_AUTO_SW,INBAND_AUTO_FLAG,NOT_AUTO
        BCLR COMP_FLAG
        BCLR LP_2SEC_DET BRSET ESF_LED,chk_inband_lpup
        BRCLR get_esf_lpbk,chk_ia_flag1
        BRSET $ESF_ARM_DET,esf_UP_CODE_DET   ;check if ESFDL lpup occured
chk_ia_flag1:
        BRCLR INBAND_AUTO_FLAG,chk_arming_EXIT   ;IN AUTO MODE, GET OUT
```

-68-

```
chk_inband_lpup:
    LDA  #TIME_1SEC              ;set scan time to 1 second
    STA  qualify_time
    BCLR DATA_SEL                ;set to office side
    JSR  DET_ARM_CODE            ;GO SET UP GATE ARRAY
    JSR  SCAN_QUALIFY            ;CHK IF PATTERN IS BEING RECEIVED
    BRCLR $COMP_FLAG,clr_arming_flag  ;IF COMP FLAG IS HIGH THEN PTRN DETECTED
    BCLR COMP_FLAG               ;clr COMP flag
    BRSET ESF_LED,check_2        ;branch if not detecting ESF
    BRCLR INBAND_AUTO_FLAG,chk_arming_EXIT ;IN AUTO MODE, GET OUT
check_2:
    BRSET sf_rcv_arming,chk_arming_EXIT
    LDA  #TIME_4SEC              ;set scan time to 4 seconds
    STA  qualify_time
    JSR  SCAN_QUALIFY            ;CHK IF PATTERN IS BEING RECEIVED
    BRCLR $COMP_FLAG,clr_arming_flag  ;IF COMP LINE IS HIGH THEN PATT. DETECTED
    CLR  SF_CURRENT_STATE        ;clr rcv flags for other codes
    BSET sf_rcv_arming           ;rcv arming code
    BRA  chk_arming_EXIT
clr_main_rcv_state_arming:
    CLR  SF_CURRENT_STATE        ;clr rcv flags for other codes
    BRA  chk_arming_EXIT
clr_arming_flag:
    BCLR sf_rcv_arming           ;clr rcv flags for other codes
    BRA  chk_arming_EXIT esf_UP_CODE_DET:
    BSET COMP_FLAG               ;we see loopup code
    CLR  ESF_CURRENT_STATE       ;start running esf lpbk det rountine
chk_arming_EXIT:
    RTS SETUP.S
;****************************************************************
;*         CONFIGURE I/O PORTS & TIMER                          *
;****************************************************************

START:                  ;'START' reset vector
    SEI                 ;disable interrupts
;----------------------------------------------------------------
START1:
    LDA  #0BFH          ; set data direction reg.'s
    STA  ADDR           ;
    LDA  #0FFH          ; 1 = output
    STA  BDDR           ;
```

```
              LDA   #11101011B    ; 0 = input - will change later
              STA   CDDR          ;
         ;-------------------------------------------------------------
              LDA   #00011110B    ;SET INTIAL VALUES OF PORTS,power led on
  5           STA   APORT         ;
              LDA   #00111100B    ;
              STA   BPORT         ;
              LDA   #11011111B    ;
              STA   CPORT         ;
 10           BCLR  POWER_LED     ;turn on power led ;-------------------------------------------------------------
              LDA   #0C0H         ;set RAM0 and RAM1 bit gives extra data memory
              STA   OPTION        ;
         ;-------------------------------------------------------------
 15           BSET  $CCLK
         ;-------------------------------------------------------------
              LDA   #TCR_MASK     ;SET UP TIMER CONTROL REG.
              STA   TCR
         ;-------------------------------------------------------------
 20      CLEAR_RAM:
              LDA   #00H
              LDX   #00H
         RAM_LOOP:
              STA   RAM_START,X
 25           INX
              CPX   #RAM_END
              BEQ   RAM_DONE
              JMP   RAM_LOOP
         RAM_DONE:
 30           JSR   DELAY_2
              JSR   DELAY_2
              JSR   DELAY_2
              JSR   DELAY_2
              JSR   DELAY_2

35      ;-------------------------------------------------------------
         SET_RELAYS:
         ;-------------------------------------------------------------

CLI                 ;turn interrupts loose
              JSR   OFFICE_OFF    ;turn off loopback relays(note: need timer to control relays)
 40           SEI                 ;turn off interrupts LOOP_SKIP:
         ;-------------------------------------------------------------
         ; INTIALIZE COUNTERS AFTER RAM CLEAR
         ;-------------------------------------------------------------
 45           LDA   #NONERR_THRES
```

-70-

```
            STA  NONERR_CNT
;-----------------------------------------------------------------
            BSET $X_RESET              ;set reset pin on gate array
            JSR  DELAY_2
  5         JSR  DELAY_2
            JSR  DELAY_2
            JSR  DELAY_2
            LDA  #0FEH
            STA  xmt_xilinx_buffer     ;set control register to default
 10     ;-----------------------------------------------------------------
            BCLR $SER_CLK

BCLR 0,CDDR

BCLR POWER_LED             ;turn on power led

CLR  frame_seek_state      ;initialize esf framing routine
 15         CLR  state_variable        ;initialize esf framing routine
            LDA  #main_normal_state_value  ;go to normal state
            STA  main_current_state    ;go to normal state
            CLR  SF_CURRENT_STATE      ;initialize rcv states for all codes
            LDA  #DL_BYTE_COUNT        ;RELOAD ESF LOOPCODE DETECT
 20         STA  DL_BYTE_COUNTER       ;RELOAD ESF LOOPCODE DETECT
            CLR  ESF_CURRENT_STATE     ;SET TO STATE 0
            CLR  ESF_IGNORE_STATE      ;reset esf ignore state CLI
            LDA  #030H
 25         STA  SCBRR    ;CONFIGURE BAUD RATE - 9600 BUAD (3800Hz) w/4MHz xtal
            LDA  #000H
            STA  SCCR1    ;CONFIGURE SCI CONTROL REG1
        ;   LDA  #02CH
            STA  SCCR2    ;CONFIGURE SCI CONTROL REG2
 30         LDA  SCSR
            LDA  SCDR
        ;-----------------------------------------------------------------
            LDA  #00001110B    ;SET COP FOR 16.54 MS TIME OUT
            STA  COPCR
 35         LDA  #055H
            STA  COPRR
            LDA  #0AAH
            STA  COPRR
            BCLR POWER_LED     ;turn on power led
 40         BCLR LOS_SPAN_FLAG ;initialize to no los for span(CPE)
            BCLR LOS_DSX_FLAG  ;initialize to no los for dsx
        ;-----------------------------------------------------------------
            JMP  MAIN   ;<< GO TO MAIN BODY >>
        ;-----------------------------------------------------------------
```

-71-

A preferred embodiment of the present invention has been described herein. It is to be understood, of course, that changes and modifications may be made in the embodiments shown without departing from the true scope and spirit of the present invention, as defined by the appended claims.

We claim:

1. A network interface unit for interconnecting incoming and outgoing telephone lines with incoming and outgoing customer premises lines comprising, in combination:

a single, planar circuit board assembly, interconnected to said telephone lines and customer premises lines;

a first relay interconnected to both said incoming telephone and customer lines and mounted on said board;

a second relay interconnected to said outgoing customer and telephone lines and mounted on said board; and a controller, mounted on said board and having both an application specific integrated circuit and a processor, for monitoring data along said lines, recognizing a loopback signal, and responsively activating said relays to interconnect said incoming and outgoing telephone lines.

2. A network interface unit as claimed in claim 1 wherein said controller further includes a converter for converting bipolar signals on said incoming telephone line to unipolar signals.

3. A network interface unit as claimed in claim 1 wherein said controller further includes frame circuitry for recognizing frames of data on said incoming telephone line.

4. A network interface unit for interconnecting incoming and outgoing telephone lines with incoming and outgoing customer premises lines comprising, in combination:

a single, planar circuit board assembly, interconnected to said telephone lines and customer premises lines;

a first relay interconnected to both said incoming telephone and customer lines and mounted on said board;

a second relay interconnected to said outgoing customer and telephone lines and mounted on said board; and a controller, mounted on said board and having both an application-specific integrated circuit and a processor for monitoring data along said lines, recognizing a loopback signal and responsively activating said relays to interconnect said incoming and outgoing telephone lines, said controller further including a convertor for converting bipolar signals on said incoming telephone line to unipolar signals.

5. A network interface unit for interconnecting incoming and outgoing telephone lines with incoming and outgoing customer premises lines comprising, in combination:

a single, planar circuit board, interconnected to said telephone lines and to said customer premises lines;

a first relay interconnected to both said incoming telephone and customer premises lines, said first relay mounted on said planar circuit board;

a second relay interconnected to said outgoing customer and telephone lines, said second relay mounted on said planar circuit board; and a controller mounted on said planar circuit board, said controller including both an application specific integrated circuit and a processor, said controller monitoring data along said lines, recognizing a loopback signal, and responsively activating said relays to interconnect said incoming and outgoing telephone lines, and said application specific integrated circuit including (i) bipolar to unipolar data conversion circuitry, (ii) framer circuitry and (iii) pattern recognition circuitry.

* * * * *